United States Patent
Abiko et al.

(10) Patent No.: US 6,807,363 B1
(45) Date of Patent: Oct. 19, 2004

(54) DIGITAL MOVING PICTURE DATA PLAYER SYSTEM HAVING A TIME-BASED ACCESS LIST

(75) Inventors: Yukihiro Abiko, Kawasaki (JP); Hideo Kato, Kawasaki (JP); Tetsuo Koezuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 09/675,051

(22) Filed: Sep. 29, 2000

Related U.S. Application Data

(63) Continuation of application No. PCT/JP99/06053, filed on Oct. 29, 1999.

(51) Int. Cl.⁷ ......................... H04N 5/783; H04N 5/781
(52) U.S. Cl. ............................. 386/68; 386/69; 386/70; 386/82; 386/111
(58) Field of Search ................................ 386/1, 33, 34, 386/37, 40, 45, 46, 111, 112, 125, 126, 98, 105–106, 69–70, 68, 82; 348/423.1; H04N 5/76, 9/79, 5/781, 5/783

(56) References Cited

U.S. PATENT DOCUMENTS

| | | | | |
|---|---|---|---|---|
| 5,621,840 A | * | 4/1997 | Kawamura et al. | 386/68 |
| 5,737,479 A | * | 4/1998 | Furinami | 386/95 |
| 5,808,722 A | | 9/1998 | Suzuki | |
| 5,923,811 A | * | 7/1999 | Kawamura et al. | 386/65 |
| 6,078,722 A | * | 6/2000 | Kawamura et al. | 386/68 |
| 6,308,003 B1 | * | 10/2001 | Hirabayashi et al. | 386/70 |
| 6,504,994 B2 | * | 1/2003 | Kawamura et al. | 386/95 |
| 2001/0031132 A1 | * | 10/2001 | Shirakawa et al. | 386/125 |
| 2002/0044757 A1 | * | 4/2002 | Kawamura et al. | 386/46 |
| 2002/0048448 A1 | * | 4/2002 | Daniels | 386/40 |
| 2002/0071662 A1 | * | 6/2002 | Tatsumi et al. | 386/100 |

FOREIGN PATENT DOCUMENTS

| | | | | |
|---|---|---|---|---|
| CM | 97122896.5 | 9/1998 | | H04L/12/00 |
| CN | 207075 | 2/1997 | | H04J/3/18 |
| CN | A 1193858 | 9/1998 | | H04L/12/00 |
| EP | 0 735 782 A2 | 10/1996 | | H04N/9/877 |
| EP | 0 920 219 A2 | 6/1999 | | H04N/7/52 |
| JP | A 7 30886 | 1/1995 | | H04N/7/24 |
| JP | A 8 63884 | 3/1996 | | G11B/20/10 |
| JP | A 8 83884 | 3/1996 | | G11B/20/10 |
| JP | A 8 331511 | 12/1996 | | H04N/5/92 |
| JP | A 9 128895 | 5/1997 | | G11B/20/10 |
| JP | A 9-205618 | 8/1997 | | H04N/5/92 |
| JP | A 9 167445 | 9/1997 | | G11B/20/10 |
| JP | A 10 164512 | 6/1998 | | H04N/5/92 |
| JP | 10 164512 | 6/1998 | | H04N/5/92 |
| JP | A 11 41559 | 2/1999 | | H04N/5/92 |
| JP | A 11 164256 | 6/1999 | | H04N/5/93 |
| TW | A 297975 | 2/1997 | | H04J/3/18 |

* cited by examiner

Primary Examiner—Thai Tran
(74) Attorney, Agent, or Firm—Staas & Halsey LLP

(57) ABSTRACT

The present invention relates to an image reproducing device, and an image recording/reproducing device, which reproduce encoded image data. With these devices, special reproduction such as reproduction at an arbitrary speed-multiple, etc., and special recording/reproduction can be made with ease. A packet information generating unit (23) generates packet information composed of PTS (Presentation Time Stamp) included in a packet header of an MPEG stream, and a file address of the packet header. A controlling unit obtains a reproduction point of an MPEG stream based on the packet information referenced by a packet information referencing unit (25), reads the corresponding MPEG stream from the information storing unit (24), and outputs the read stream to a decoding unit (26). The decoding unit (26) decodes and outputs the MPEG stream.

53 Claims, 24 Drawing Sheets

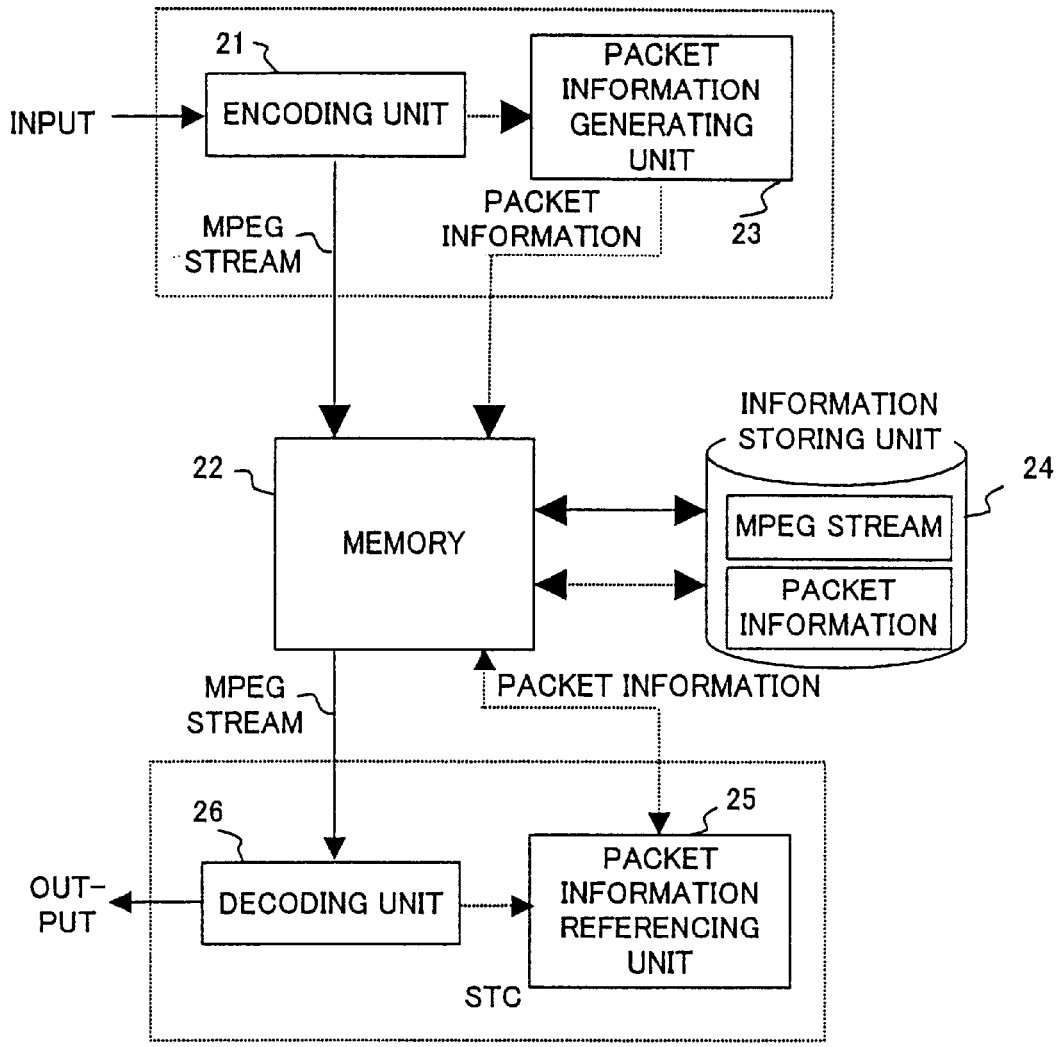
F I G. 2

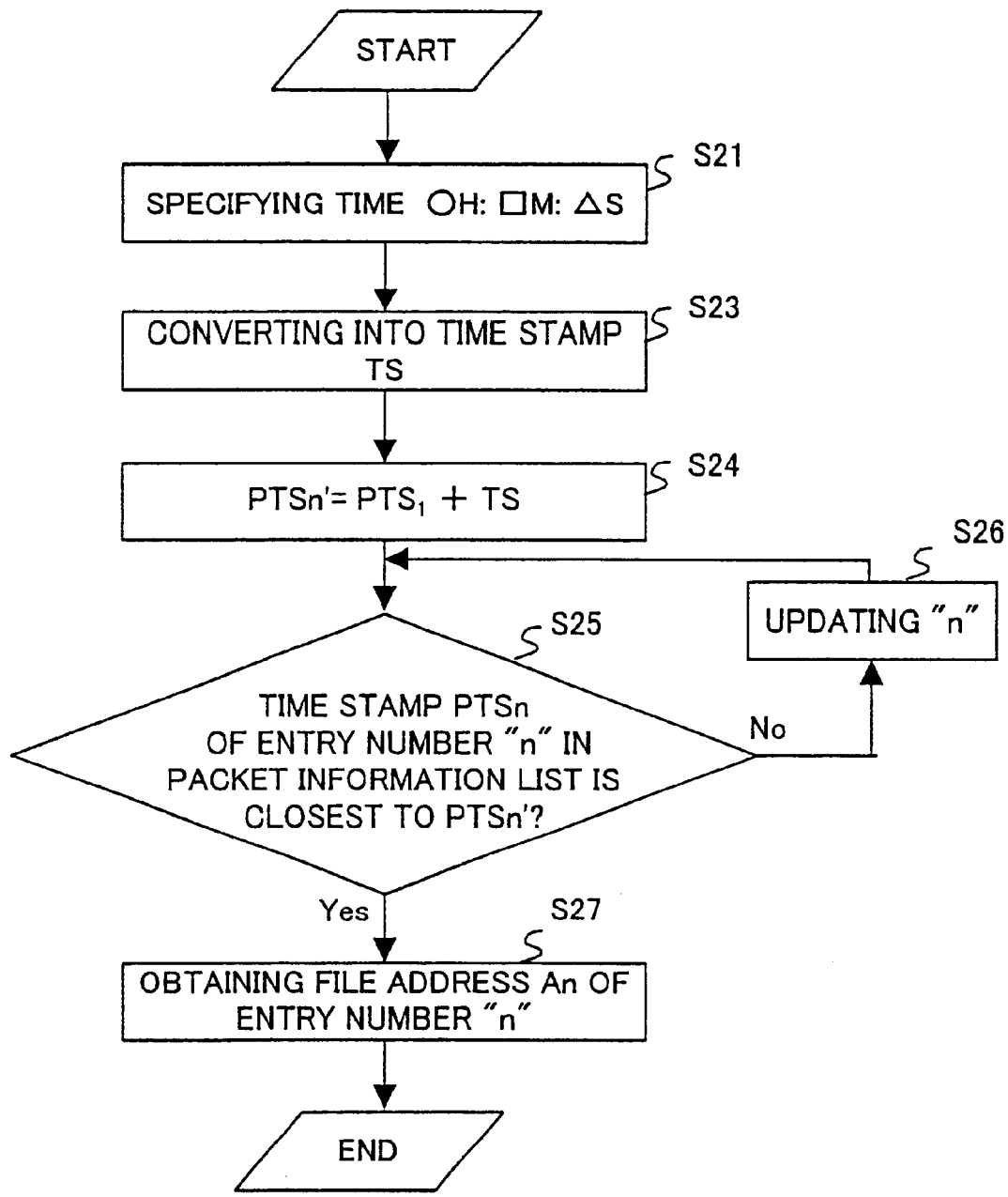
F I G. 7

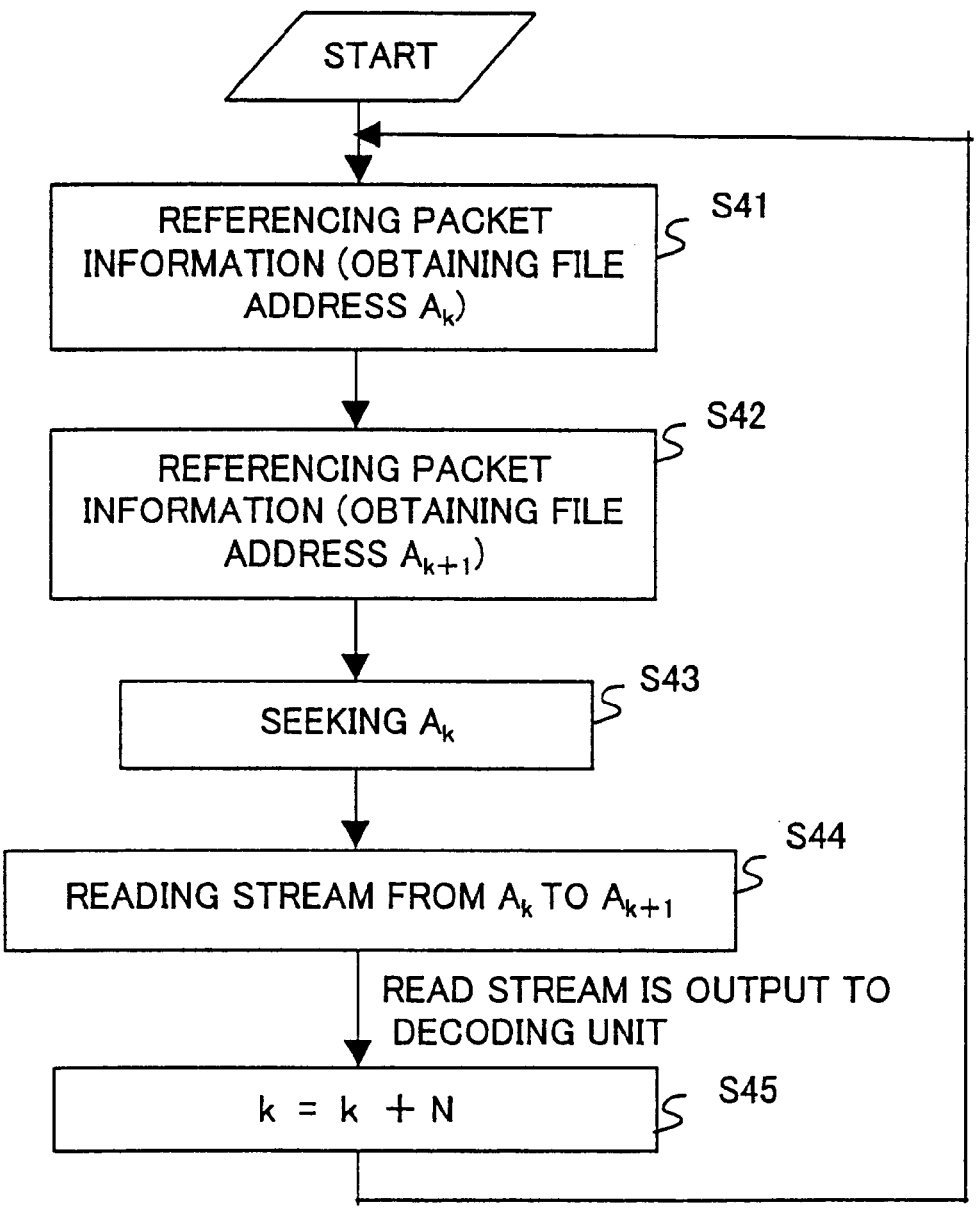
F I G. 9

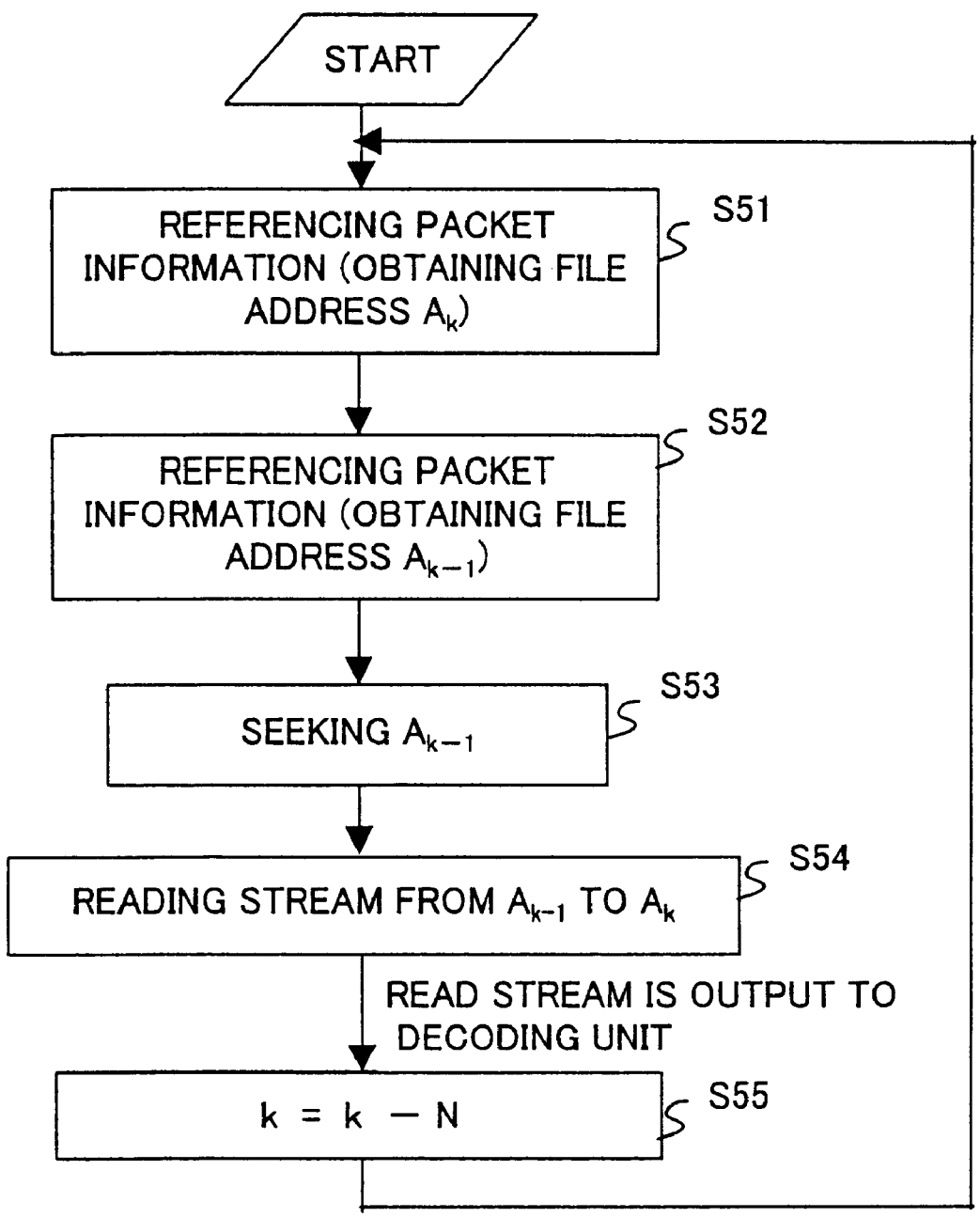
F I G. 1 0

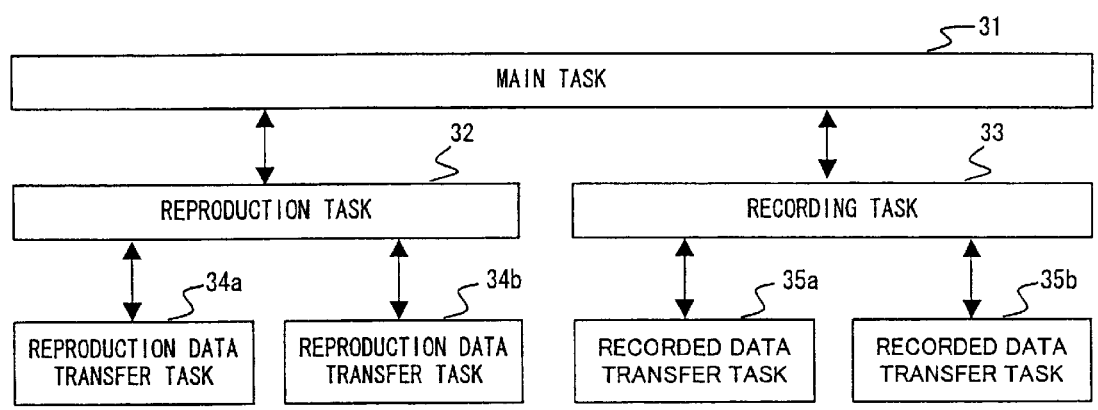
F I G. 1 2

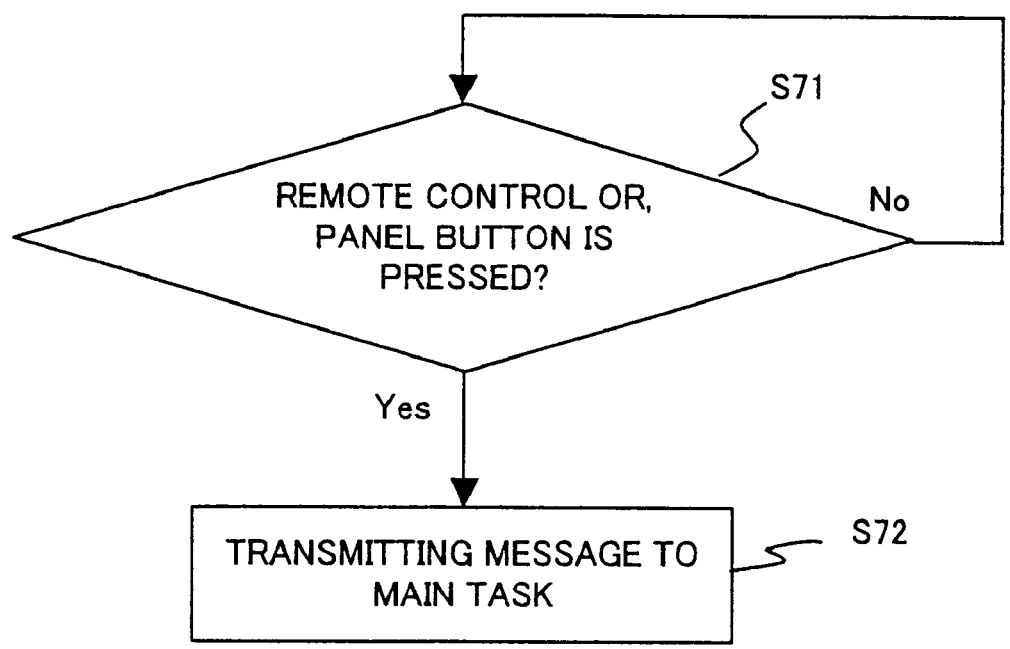
F I G. 1 5

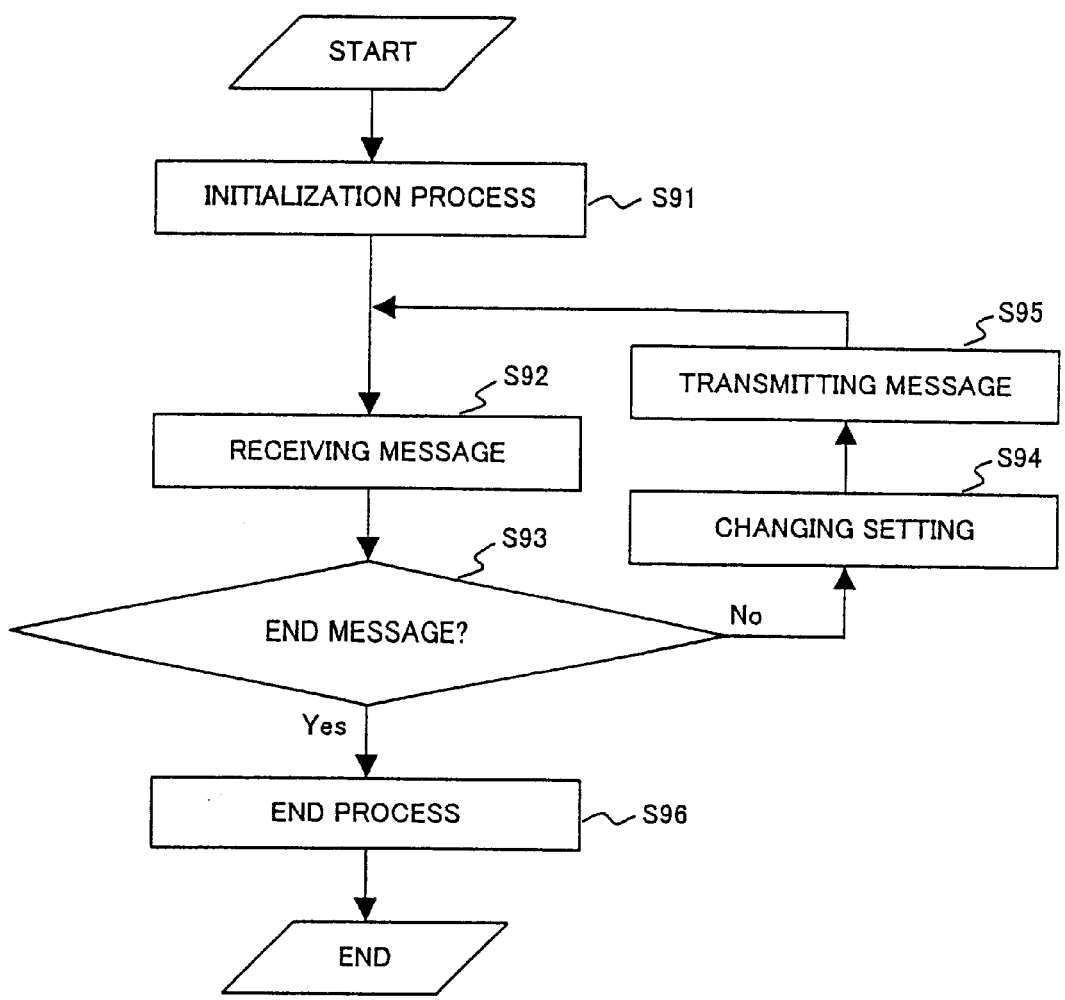
F I G. 1 7

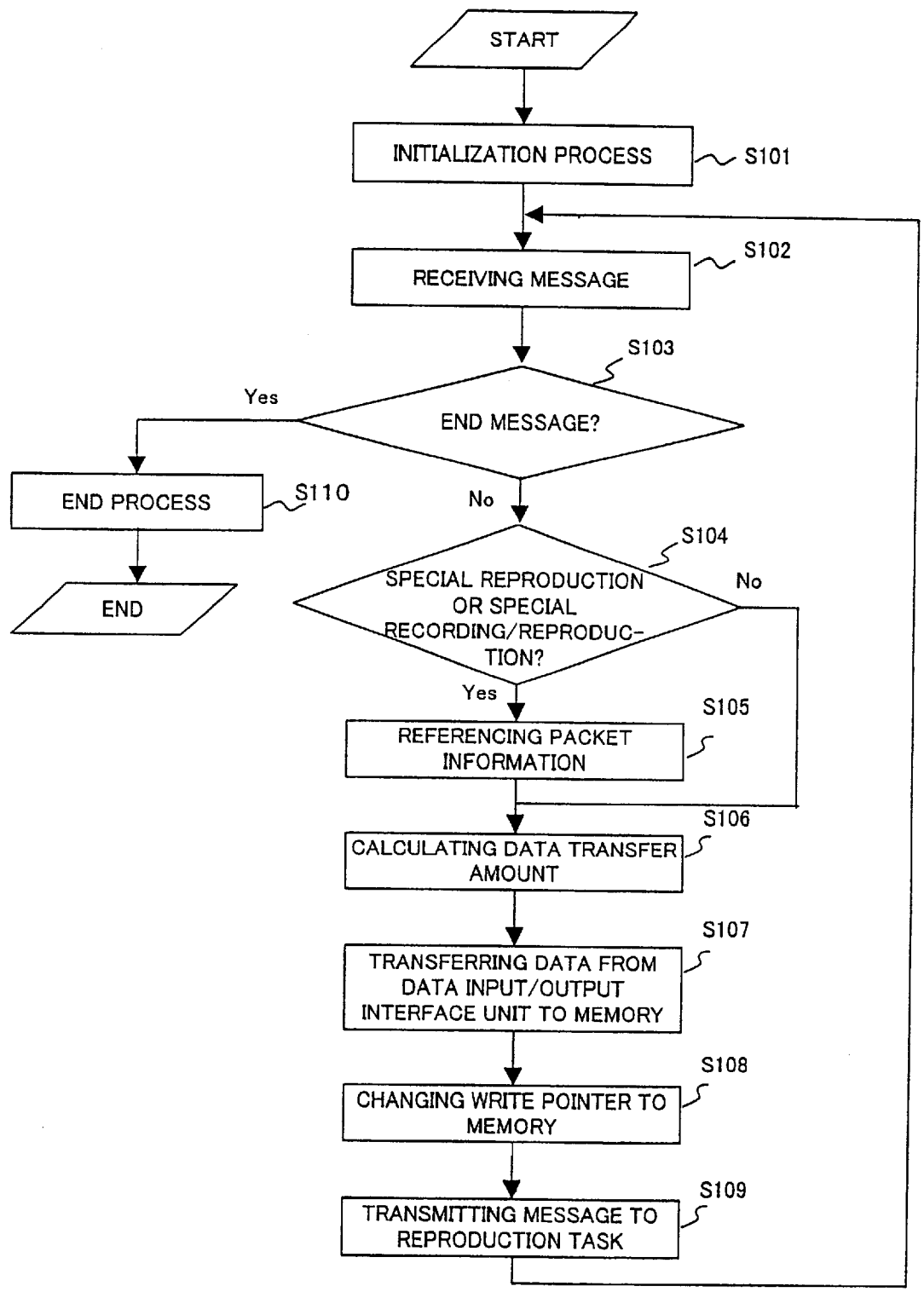
F I G. 18

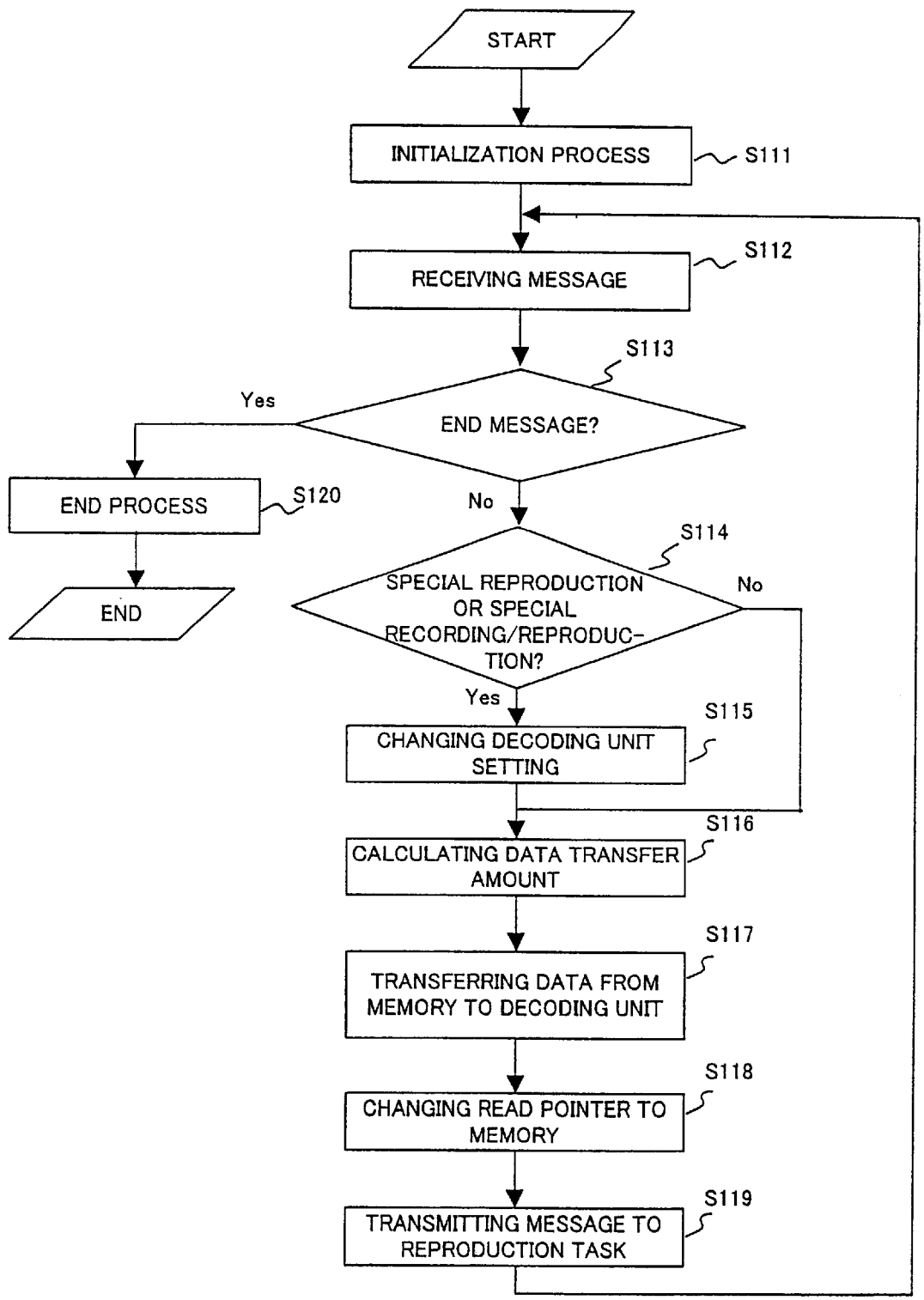
F I G. 19

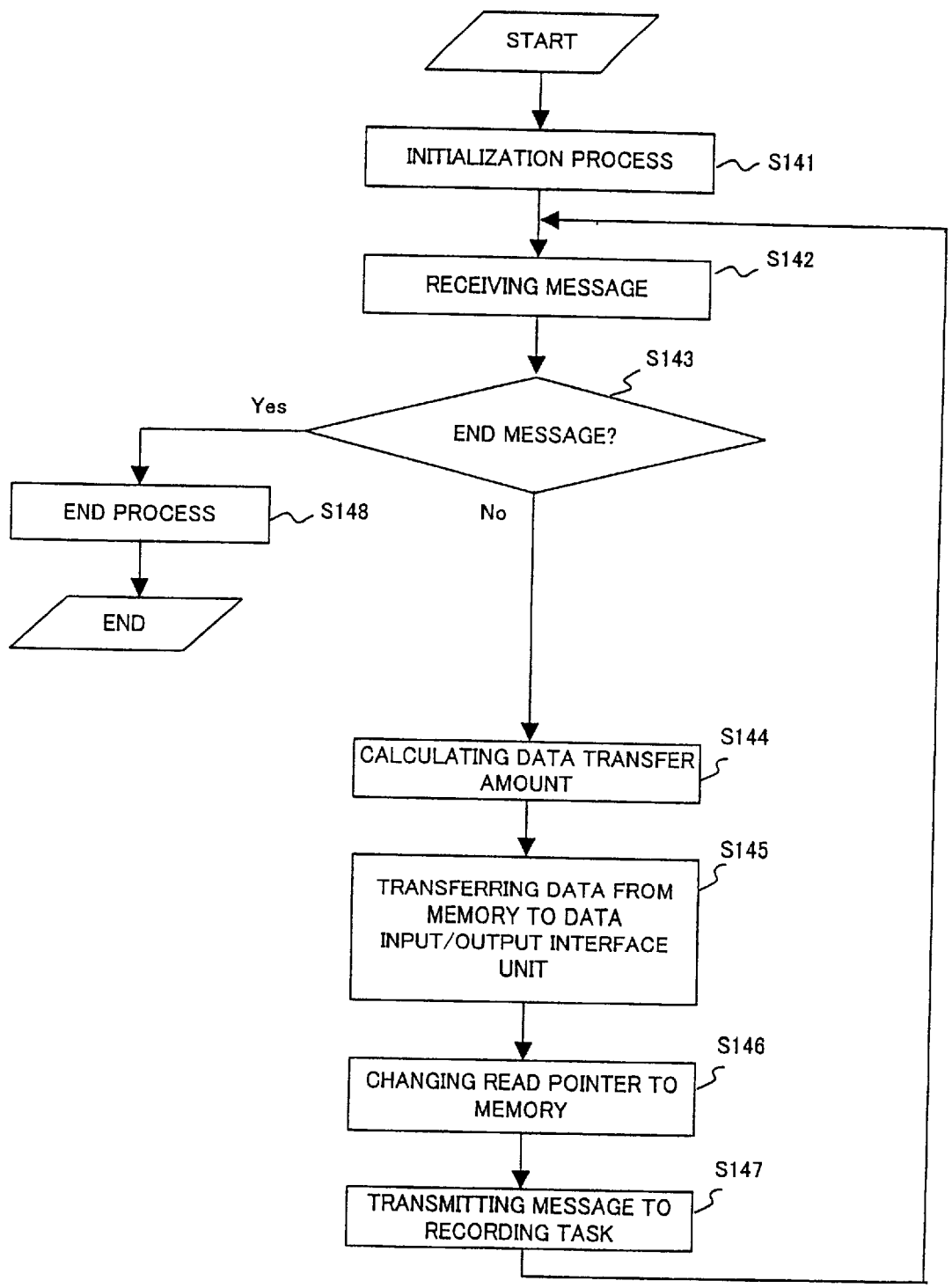
F I G. 2 2

DIGITAL MOVING PICTURE DATA PLAYER SYSTEM HAVING A TIME-BASED ACCESS LIST

CROSS REFERENCE TO RELATED APPLICATION

This application is a continuation of international PCT application No. PCT/JP99/06053 filed on Oct. 29, 1999.

BACKGROUND OF THE INVENTION

1. Field of the Invention

The present invention relates to a device reproducing an encoded image, a device encoding, recording and reproducing an image, a method recording/reproducing an image, and a storage medium on which is recorded a program for recording and reproducing an image.

2. Description of the Related Art

In recent years, MPEG (Moving Picture Experts Group) methods such as ISO/IEC-11172 (MPEG-1), ISO/IEC-13818 (MPEG-2), etc., have been standardized internationally, and devices for recording and reproducing MPEG streams according to these methods have been developed.

In the meantime, randomly accessible storage media such as optical, magneto-optical, and magnetic disks have been significantly increasing in capacity and dropping in price, and have been replacing magnetic tapes for recording purposes. Additionally, with randomly accessible storage media, special reproduction at an arbitrary speed-multiple, special recording/reproduction, etc., can be made.

Special reproduction of an MPEG stream such as reproduction at an arbitrary speed-multiple, etc., is implemented by seeking the start of a frame, GOP (Group Of Pictures), a packet, etc. For example, the position of a jump destination must be obtained beforehand to make a jump such as an immediate start access, etc.

For example, Japanese Patent Application No. 5-306567 discloses the technique for recording a GOP start code or the information about the presence/absence of an I picture in a subcode area of a magnetic tape.

Japanese Patent Application No. 7-298048 describes that a byte offset from the beginning of a file and the number of accumulated frames are recorded as information in an immediate start access table using a GOP start code.

Japanese Patent Application No. 7-36461 reveals that a sector address and a GOP time code are recorded as information in a special reproduction table using a GOP start code.

The size of circuitry, which is required for encoding/decoding, increases within a device recording and reproducing an image compressed in an MPEG format, even if only normal recording or reproduction is implemented, leading to a rise in device cost. To enable such a recording/reproducing device to make reproduction at an arbitrary speed-multiple, special reproduction such as clip editing, special recording, etc., the circuit size and the device cost further increase. Additionally, in special reproduction or recording, reproduction data and recorded data must be simultaneously transmitted or a transfer block size must be varied. A firmware description for controlling such a data transfer becomes complicated, so that the (overall?) cost further rises due to an increase in man-hours required for development or in control code or control circuitry size.

Furthermore, if a conventional method using a GOP start code or a GOP time code encoded in a GOP header is adopted to synchronize audio and video packets, troublesomeness of a process at the time of table generation, and an increase in DSP circuitry size become problematic.

It is necessary that the information used for special reproduction is not dependent on a storage medium or a frame rate. Especially, digital information like an MPEG stream is equally handled by a recording/reproducing device and a personal computer. Therefore, data must be moved or copied between storage media in different formats, for example, from a magnetic disk to an optical disk. Furthermore, MPEG streams are widely used in growing networks. Information of an MPEG stream must be made available with both of NTSC and PAL methods implementing different frame rates.

The above described invention of Japanese Patent Application No. 5-306567 is tailored to a magnetic tape, and not implemented as a list or a table. Additionally, this invention is not intended to make special reproduction based on a random access in nature.

According to the invention of Japanese Patent Application No. 7-298048, recorded information is frames. Considering the case where an immediate start access is made by specifying a seek destination with time, use of a single frame rate is assumed. Therefore, MPEG streams with different frame rates cannot be handled.

According to the invention of Japanese Patent Application No. 7-36461, a GOP time code is recorded. Therefore, this invention can cope with the case where an immediate start access is made by specifying a seek destination with time. However, since information is described in sectors, there is a disadvantage that a table must be again generated when a storage medium is changed.

To efficiently make special reproduction or special recording/reproduction, a data position required to directly access the data must easily be obtained from the time information specified by an application or a user.

As its method, a data position may be obtained with a GOP time code or by counting the number of frames. The former method must extract a GOP time code, and examine both of the position of the GOP start code and that of the packet including the code in an MPEG stream. Therefore, this method is inefficient. The latter method requires a process for counting the number of frames, and must cope with the case where frame rates are different. Therefore, also this method is inefficient.

When special reproduction is made, a data transfer speed does not become constant. Accordingly, there is a need to address this problem. Additionally, when special reproduction is made in combination with recording, its process becomes complicated due to the complexity of data traffic within the system.

Furthermore, for a storage medium such as an optical disk, a magneto-optical disk, or a magnetic disk, a read or a write operation is sometimes disabled for several seconds, when a fault is detected in internal parameter adjustment or a storage area, and data is written to another area. If such a phenomenon occurs during a DMA transfer at a read or a write operation, data is lost during recording, and video is suspended during reproduction.

An object of the present invention is to allow special reproduction such as reproduction at an arbitrary speed-multiple, etc., and special recording/reproduction to be easily made in an image reproducing device reproducing encoded image data. Another object of the present invention is to allow recording, reproduction and a data transfer to be efficiently made.

SUMMARY OF THE INVENTION

FIG. 1A explains the principle of the invention whereas FIG. 1B explains the principle of the invention, which further comprises packet information generating unit.

The invention comprises packet information referencing unit 1 for referencing packet information composed of a time stamp included in a packet header of encoded image data and information pointing to the packet header, and decoding unit 2 for decoding an encoded image based on the packet information referenced by the packet information referencing unit 1.

According to this invention, an arbitrary reproduction point can easily be obtained by referencing packet information composed of a time stamp included in a packet header and information pointing to the packet header.

The invention may further comprise packet information generating unit 3 for generating packet information composed of a time stamp included in a packet header of encoded image data, and information pointing to the packet header.

According to this invention, packet information of image data encoded by a different device can be generated by the packet information generating unit 3, whereby an arbitrary reproduction point can be obtained based on the packet information.

For example, if encoded image data is an MPEG stream, packet information composed of PTS (Presentation Time Stamp) included in a packet header of the MPEG stream, and a file address of the packet header is generated, and a packet information list is further generated.

PTS of a video packet in an MPEG stream is added in correspondence with all of picture start codes, while PTS of an audio packet is added to all of packets. A time stamp such as PTS obtained from an MPEG stream, STC (System Time Clock) obtained by decoding unit 2, and the like are information common to all of streams counted by a 90-kHz counter for MPEG-1. Accordingly, time information that is not dependent on a frame rate can be obtained by using the PTS.

By way of example, if a reproduction point is specified with a time from the first packet of image data, the time is converted into a time stamp (TS), and packet information having a value close to that of the time stamp (TS) is searched from a packet information list, so that the file address of the corresponding packet can be obtained, and special reproduction such as special reproduction at an arbitrary speed-multiple or special recording/reproduction can easily be implemented.

Furthermore, encoding unit for encoding an image and for recording the encoded image on an external or internal storage medium may be comprised.

According to this invention, packet information composed of a time stamp in a packet header of encoded image data and information pointing to the packet header can be generated, when an image is encoded and recorded. As a result, special reproduction such as forward and backward image reproduction at an arbitrary speed-multiple, a random access, etc., and special recording such as live monitoring, real-time shift, etc. can be implemented without expanding hardware, and without making recording and reproduction processes complicated.

Furthermore, an image encoding process performed by the encoding unit, a recorded data transfer process for transferring encoded image data to the recording unit, a reproduction data transfer process for transferring image data recorded on the recording unit to the decoding unit 2, and an image data decoding process performed by the decoding unit 2 may be implemented as multiple tasks.

In this case, the descriptions of the transfer processes can be simplified by defining a recording data transfer task and a reproduction data transfer task as different tasks.

Additionally, by individually setting a transfer data block size for each data transfer task, a data transfer at the time of special reproduction and special recording/reproduction can be made efficient.

Furthermore, the priority of the recorded data transfer task may be assigned higher than that of the reproduction data transfer task.

By assigning a higher priority to the recording data transfer task, data to be recorded can be prevented from being lost.

According to one preferred embodiment of the present invention, address information (file pointer) of a packet header is used as a data position, and PTS included in the packet header is used as time information. Since PTS is attached to a packet by encoding unit when data is encoded in an MPEG format, packet information generating unit can easily generate a special reproduction list by using the PTS without particularly generating data for special reproduction. Additionally, because the encoding unit uses a GOP start code when extracting a packet header of a packet including a GOP header, information of a packet including a GOP start code can also be obtained with ease.

BRIEF DESCRIPTION OF DRAWINGS

FIG. 2 shows the configuration of a first preferred embodiment;

FIG. 7 is a flowchart showing the process based on a second packet information reference method;

FIG. 9 is a flowchart showing the process of reproduction at a speed-multiple of "N".

FIG. 10 is a flowchart showing a simple backward reproduction process;

FIG. 12 explains tasks according to a first preferred embodiment;

FIG. 15 is a flowchart showing the process of a user interface task;

FIG. 17 is a flowchart showing the process of a reproduction task;

FIG. 18 is a flowchart showing the process of a reproduction data transfer tasks 34a or 64a;

FIG. 19 is a flowchart showing the process of a reproduction data transfer task 34b or 64b;

FIG. 21 is a flowchart showing the process of a recorded data transfer task 35a or 65a;

FIG. 22 is a flowchart showing the process of a recorded data transfer task 35b or 65b;

DESCRIPTION OF THE PREFERRED EMBODIMENTS

Figure 1A:
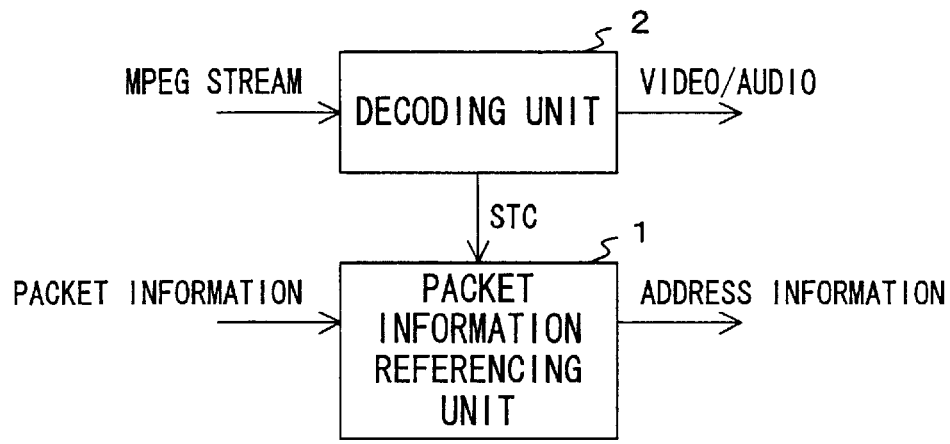
FIGS. 1A and 1B show the principles of the present invention.
Figure 1B:
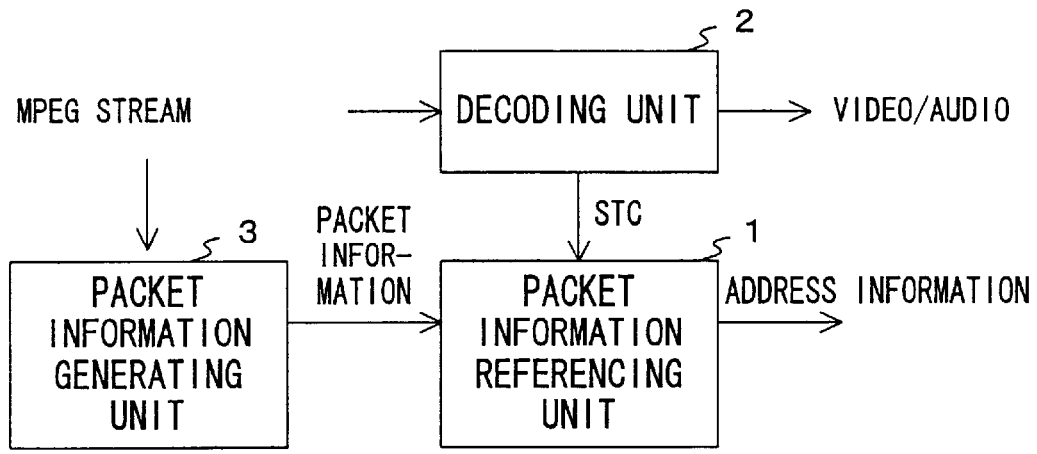

Hereinafter, preferred embodiments according to the present invention are explained by referring to the drawings. FIG. 2 shows the configuration of a device for recording and reproducing an MPEG stream, according to a first preferred embodiment of the present invention.

An encoding unit 21 converts an input image into image data in an MPEG format (MPEG stream), and outputs the converted MPEG stream to a memory 22.

A packet information generating unit 23 generates packet information composed of PTS (Presentation Time Stamp) included in a packet header of an MPEG stream, and a file address of the packet header, and further generates a packet information list composed of packet information of the packet header of a packet including a GOP header. If the encoding unit 21 can perform vide and audio encoding, PTS of an audio packet that is synchronous with GOP and its file address are added to the packet information.

Figure 3:
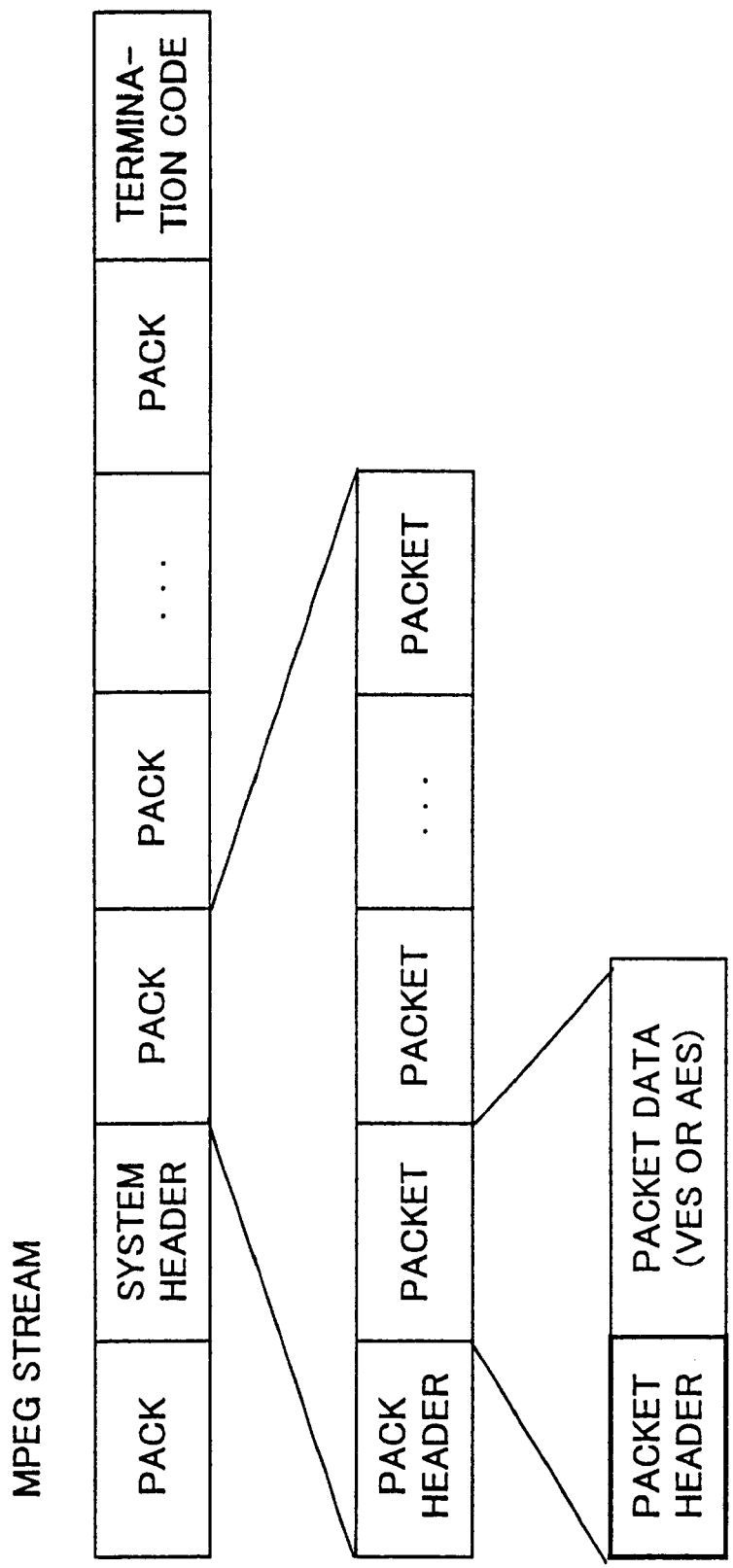
FIG. 3 explains the structure of an MPEG stream.

FIG. 3 shows the structure of an MPEG stream. Information called a time stamp (TS), which indicates when to decode and reproduce packets, is added to video and audio packets in units of decoding and reproduction called access units.

As shown in FIG. 3, the upper hierarchy of an MPEG stream is composed of a system header describing the outline of an overall stream, and packs. Each pack is composed of a pack header including a start code, an identification code, etc., and a plurality of packets. Each packet is composed of a packet header and packet data including a video elementary stream or an audio elementary stream. The packet header stores PTS (Presentation Time Stamp) used as time management information at the time of reproduction and output of an MPEG stream.

Figure 4:
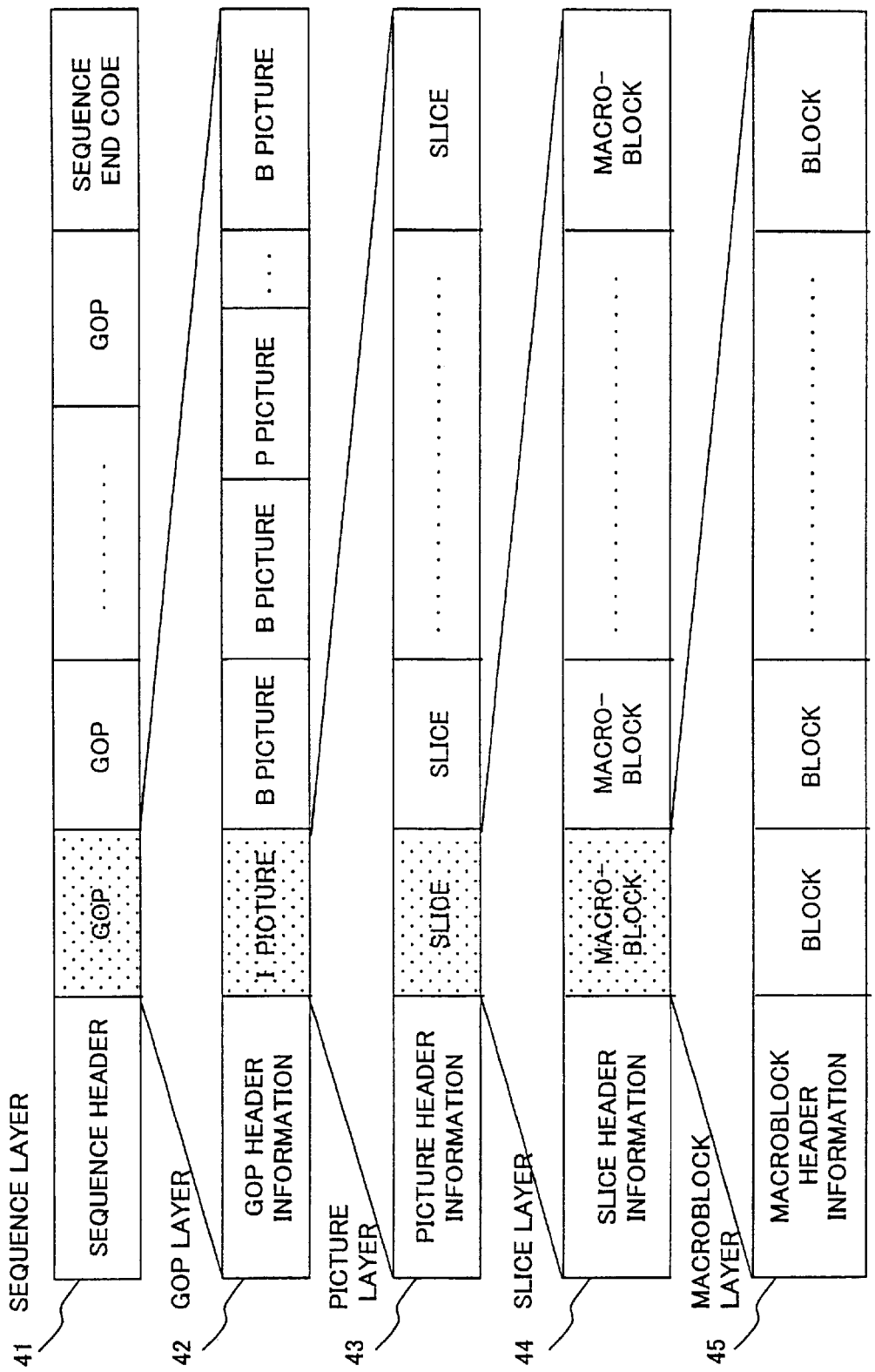
FIG. 4 explains the structure of an MPEG video stream.

FIG. 4 shows the structure of an MPEG video stream. The MPEG video stream is composed of a sequence layer, a GOP layer, a picture layer, a slice layer, and a macroblock layer.

A sequence layer 41 is structured by a sequence header, which is composed of information such as a screen size and the like, GOP, and a sequence end code.

A GOP layer 42 is structured by GOP header information, and I, B, P pictures, which belong to one GOP, and the like. An I picture is image data generated from the information of one frame without making an inter-frame prediction. A P picture is image data generated with a prediction from an I or a P picture. A B picture is image data generated with a bidirectional prediction of an I and a P picture.

A picture layer 43 is structured by picture header information and a plurality of slices. A slice layer 44 is structured by slice header information and a plurality of macroblocks. A macroblock layer 45 is structured by macroblock information and a plurality of blocks.

Figure 5:
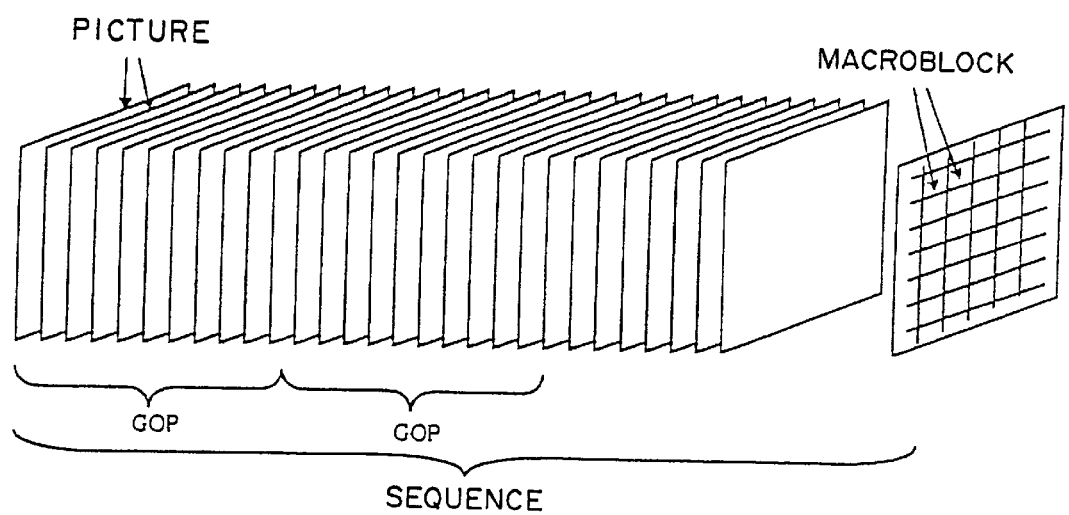
FIG. 5 explains the structure of a frame of an MPEG video stream.

FIG. 5 shows the frame structure of an MPEG video stream. A sequence is structured by a plurality of GOPs, each of which is composed of a plurality of pictures. Each picture is composed of a plurality of macroblocks.

Turning back to FIG. 2. The MPEG stream that is encoded by the encoding unit 21 and stored in the memory 22 is stored by a controlling unit not shown onto an information storing unit 24 implemented by a hard disk, a magneto-optical disk, etc.

Assuming that a reproduction point is specified by a user with the use of a time, the controlling unit obtains the reproduction point of an MPEG stream based on packet information referenced by a packet information referencing unit 25, reads the corresponding MPEG stream from the information storing unit 24, and outputs the read MPEG stream to a decoding unit 26. The decoding unit 26 decodes and outputs that MPEG stream.

Figure 6:
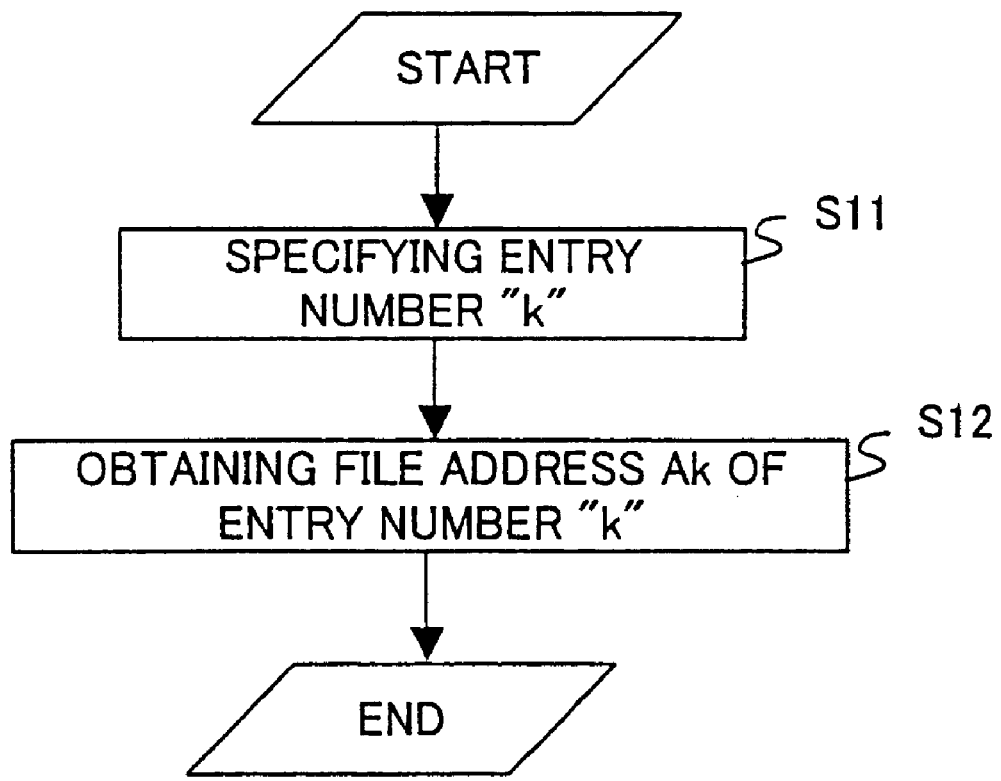
FIG. 6 is a flowchart showing the process based on a first packet information reference method.
Figure 8:
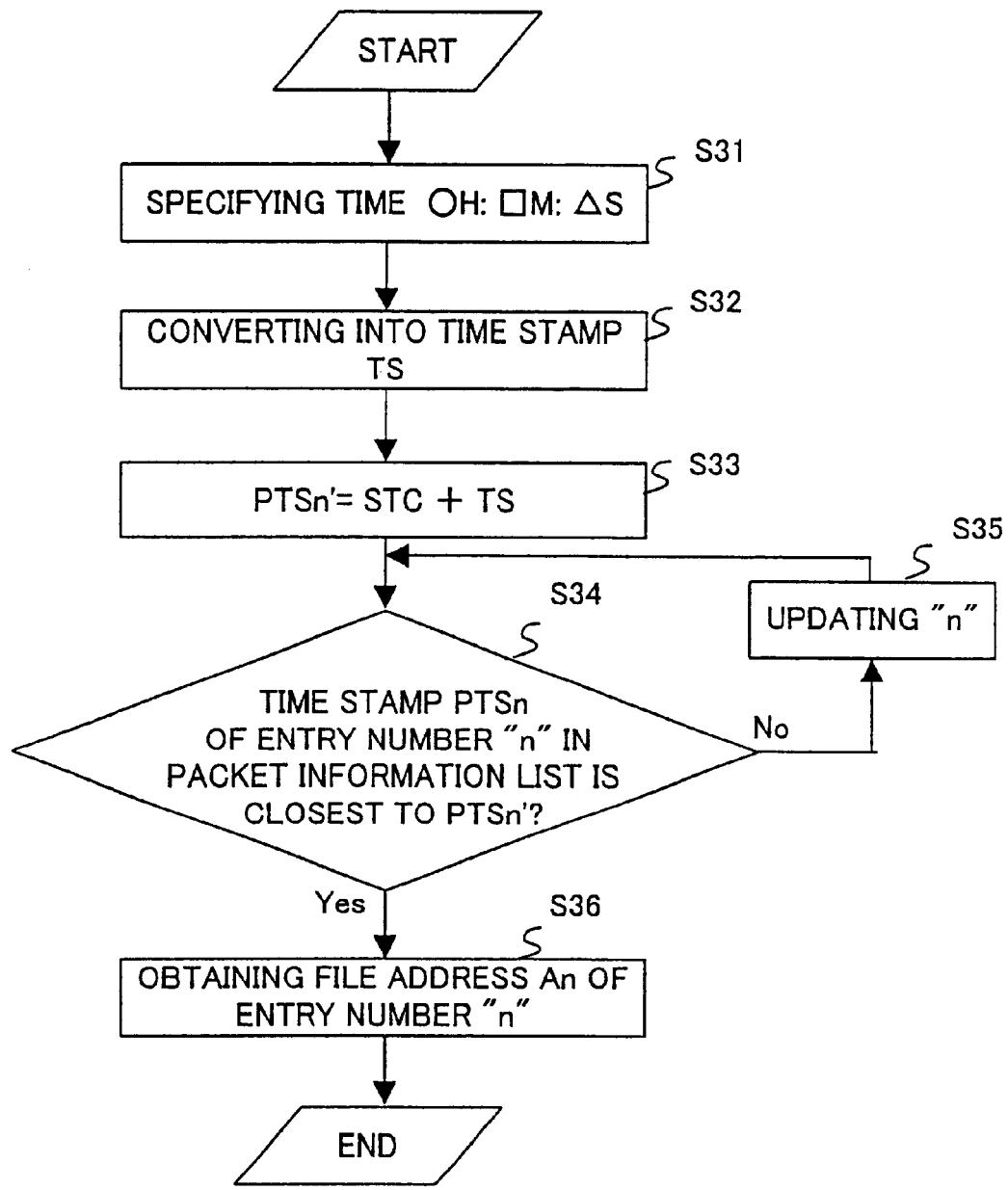
FIG. 8 is a flowchart showing the process based on a third packet information reference method.

Here, the method for referencing packet information, which is executed by the packet information referencing unit 25, is explained by referring to FIGS. 6 through 8.

This preferred embodiment adopts three method types: a method for generating a packet information list where packet information of packets including a GOP header of an MPEG stream are stored in an entry number order, and for specifying a reproduction point with an entry number (this method is referred to as a first packet information reference method); a method for specifying a reproduction point with a time obtained by using as a criterion the start of an MPEG stream (this method is referred to as a second packet information reference method); and a method for specifying a reproduction point with a time obtained by using as a criterion a packet being decoded (this method is referred to as a third packet information reference method).

With the first packet information reference method, the packet information generating unit 23 generates a packet information list by sequentially assigning an entry number to the packet information composed of the PTS of a header of a packet including GOP header of an MPEG stream, and the file address of the packet header.

Hereinafter, the process based on the first packet information reference method is explained by referring to the flowchart shown in FIG. 6, on the assumption that the above described packet information list is generated.

For example, if reproduction at a speed-multiple of "k" is specified by a user, an entry number "k" is specified in order to read packet information from the packet information list every "k" pieces (step S11 of FIG. 6). Next, the file address Ak of the entry number "k" is obtained (step S12). Then, a head is moved to the corresponding point in the information storing unit 26 based on the file address Ak, data is sequentially read out, and the read data is decoded by the decoding unit 26 to reproduce the image.

With the first packet information reference method, a file address for reading a corresponding MPEG stream can be obtained from the information storing unit 24 by specifying an entry number of a packet information list. Consequently, the processes for determining a read or a write position in forward and backward reproduction using random access or at an arbitrary speed-multiple, or in special recording/reproduction processes such as real-time shift, live monitoring, which will be described later, and the like, thereby reducing a processing time.

Next, the second packet reference method is explained. With this method, the packet information generating unit 23 generates packet information composed of PTS (Presentation Time Stamp) included in a header of a packet including GOP of an MPEG stream, and the file address of the corresponding packet header, and further generates a packet information list where entry numbers are assigned to packet information in a recording order. Note that a packet information list where entry numbers are not assigned may be generated with the second packet information reference method.

The second packet information reference method is explained below by referring to the flowchart shown in FIG. 7, on the assumption that the above described packet information list is generated.

When a reproduction point is specified by an application or a user with a time from the start of an MPEG stream (step S21 of FIG. 7), the specified time is converted into a time stamp (TS) (step S22).

For example, if reproduction is desired to be started from the point of ○H:☐M:ΔS by using as a criterion the start of the MPEG stream, the time is converted into seconds, and the value acquired by dividing the converted time by the frequency of a system clock is obtained as a time stamp (TS). This operation is represented by the following equation.

$$TS=(\circ\times60\times60+\square\times60+\Delta)/(\text{frequency of a system clock}) \quad (1)$$

Next, a time stamp PTS1 indicated by an entry number 1 in the packet information list is obtained, and the time stamp (TS) obtained with the above provided equation (1) is added to the time stamp PTS1. Then, the specified time is converted into a time stamp PTSn' (step S23). The PTSn' can be obtained with the following equation from the time stamp (TS) obtained with the equation (1) and the presentation time stamp PTS1 indicated by the entry number 1.

$$PTS'=PTS1+TS \quad (2)$$

Next, a time stamp PTSn indicated by an entry number "n" (for example, "n" is the initial value "1") is read from the packet information list, and it is determined whether or not the value of the time stamp PTSn is the closest to the time stamp PTSn' at the target reproduction point (step S24).

If the value of the time stamp PTSn indicated by the entry number "n" is apart from the value of the time stamp PTSn' at the target reproduction point by a predetermined value or more ("NO" in step S24), the process proceeds to step S25 where the entry number "n" is updated. The process then goes back to step S24 where the time stamp PTSn indicated by the updated entry number "n" is read from the packet information list, and the above described determination is made.

When the entry number having the time stamp PTSn that is closest to the time stamp PTSn' at the target reproduction point is obtained by repeating the operations in steps S24 and S25 ("YES" in step S24), a file address "An" of the corresponding entry number "n" is obtained from the packet information list (step S26). Then, the packet data at the file address An is read from the information storing unit 24 and output to the decoding unit 26, so that the MPEG stream is decoded and reproduced. In this way, the image can be reproduced from the point corresponding to the specified time.

Next, the third packet information reference method is explained. Also with this method, the packet information generating unit 23 extracts a packet header of a packet including a GOP header of an MPEG stream, and generates packet information composed of PTS (Presentation Time Stamp) included in the packet header and the file address of the packet header, similar to the second packet information reference method. Furthermore, a packet information list where entry numbers are sequentially assigned to packet information is generated.

Hereinafter, the process based on the third packet information reference method is explained by referring to the flowchart shown in FIG. 8, on the assumption that the above described packet information list is generated.

When ○H:☐M:ΔS is specified by using as a criterion a packet being decoded (step S31 of FIG. 8), the specified time is converted into a time stamp (TS) with the above described equation (1) (step S32). Then, the above described time stamp TS is added to STC (System Time Clock) of the packet being decoded, which is counted by the decoding unit 26, so that the time stamp PTSn' at the target reproduction point is calculated. This operation can be represented by the following equation.

$$PTSn'=STC+TS \quad (3)$$

Next, the time stamp PTSn indicated by the entry number "n" (for example, "n" is the initial value "1") is read from the packet information list, and it is determined whether or not the value of the time stamp PTSn is the closest to the time stamp PTSn' at the target reproduction point (step S34).

If the value of the time stamp PTSn indicated by the entry number "n" is apart from the value of the time stamp Ptsn' at the target reproduction point by a predetermined value or more ("NO" in step S34), the process proceeds to step S35 where the entry number "n" is updated. Then, the process goes back to step S34 where the time stamp PTSn indicated by the updated entry number "n" is read from the packet information list, and the above described determination is made.

When the time stamp PTSn closest to the time stamp PTSn' at the target reproduction point is detected by repeating the operations in steps S34 and S35 ("YES" in step S34), the file address An of the corresponding entry number "n" is obtained from the packet information list (step S36). Then, the packet data at the file address An is read from the information storing unit 24, and output to the decoding unit 26, which is made to decode the MPEG stream. As a result, the MPEG stream starts to be reproduced from the point corresponding to the specified time.

With the above described second and third packet information reference methods, a reproduction point, which corresponds to a time, can easily be obtained by referencing a packet information list, if the reproduction point is specified with a time obtained by using as a criterion the start of an MPEG stream, or with a time obtained by using as a criterion a packet for which a reproduction process is currently being performed.

Explained next are a special reproduction capability and special recording/reproduction capabilities in a device recording/reproducing an MPEG stream according to the first preferred embodiment. Examples of the special reproduction capability include a random access, reproduction at an arbitrary speed-multiple (fast forward reproduction, simple backward reproduction), clip editing, and repeat-reproduction. Examples of the special recording/reproduction capabilities include real-time shift and live monitoring.

Initially, an arbitrary speed-multiple reproduction process with which GOPs are reproduced every "N" is explained by referring to the flowchart shown in FIG. 9.

First of all, a time stamp TS is set to "0", and the file address $A_k$ of the entry number "k" in the packet information list, which corresponds to data being decoded, is obtained (step S41 of FIG. 9). Then, a file address $A_{k+1}$ of the next entry number k+1 is obtained by referencing the packet information list (step S42). Then, $A_k$ and $A_{k+1}-1$, which immediately precedes the file address $A_{k+1}$ of the entry number K+1, are respectively obtained as an address at a read start point and an address at a read end point from the obtained address information.

Next, a reading/writing portion of the information storing unit 24 is moved to the point corresponding to the file address $A_k$ (step S43). The stream from the file address $A_k$ to $A_{k+1}$ is then read, and the read stream is output to the decoding unit 26 (step S44).

After the value obtained by adding "N" to the value of "k" is set as a new value of "k" (step S45), the process goes back to step S41 where the packet information indicated by the entry number "k" is read. With these operations, file addresses registered to the packet information list are read out every "N", and GOPs specified by the read addresses are read out, so that the reproduction at a speed multiple of N+1 can be implemented.

If the decoding unit 26 has a frame skipping capability, more smooth reproduction can be made by combining the frame skipping capability and the above described reproduction process at an arbitrary speed-multiple. Supposing that the decoding unit 26 has the capability for skipping a B picture, B pictures are skipped in a stream where GOP is structured, for example, as "IBBPBBPBBP . . . ", and the GOPs are reproduced every "N" as described above. As a result, reproduction at a speed-multiple of 3(N+1) can be implemented. Additionally, if B pictures are skipped, it means that the first B picture, which is bidirectionally referenced for motion vectors between GOPs, is not displayed. Therefore, image noise at a GOP boundary can be prevented from occurring, without changing a GOP header at the GOP boundary.

In the above described arbitrary speed-multiple reproduction process, simple backward reproduction can be implemented by setting "N" to a negative value. The simple backward reproduction process is hereinafter described by referring to the flowchart shown in FIG. 10.

First of all, a time stamp TS is set to "0", and the file address Ak of the entry number "k" in the packet information list, which corresponds to the data being decoded, is obtained with the third packet information reference method (step S51 of FIG. 10). Because reproduction is backward in this case, the file address Ak−1 of the immediately preceding entry number k−1 in the packet information list is obtained (step 52). Then, the reading/writing portion of the information storing unit 24 is moved to the point at the file address Ak−1 (step S53). Then, the stream from the file address Ak−1 to Ak is read out, and the read stream is output to the decoding unit 26 (step S54). After the value obtained by subtracting "N" from the value of "k" is set to a new value of "k" (step S55), the process goes back to step S51 where the packet information indicated by the entry number "k" is read out. With these operations, file addresses registered to the packet information list are read out every N−1 addresses, and the GOPs specified by the read addresses are read out, so that the simple backward reproduction at a speed multiple of "N" can be implemented.

Note that image data of one GOP is reproduced in a forward direction on a time axis in this simple backward reproduction. Therefore, by reading only the data for I pictures per GOP, an unsmooth view can be prevented.

At this time, the addresses at the reproduction start and end points are respectively $A_k$ and $A_k+$ (data for I pictures).

If the decoding unit 26 has a B picture skipping capability and a P picture skipping capability, the processing amount can be reduced. This is because the need for examining the data amount of I pictures is eliminated with these capabilities.

Additionally, if random access, which starts reproduction from a desired point, is hoped to be made, a reproduction start point is normally given as time information from an application. Therefore, a reproduction start point is obtained with the above described second or the third packet information reference method. The head of the information storing unit 24 is moved to the point to be accessed, and the stream is continuously read out.

Next, a clip editing process is explained. A stream that is specified with one or more arbitrary pairs of start and end points is called a clip. When a clip is edited, its start and end points are specified with a time from the start of a stream or with an entry number of a packet information list, without dividing or merging a file itself.

Figure 11:
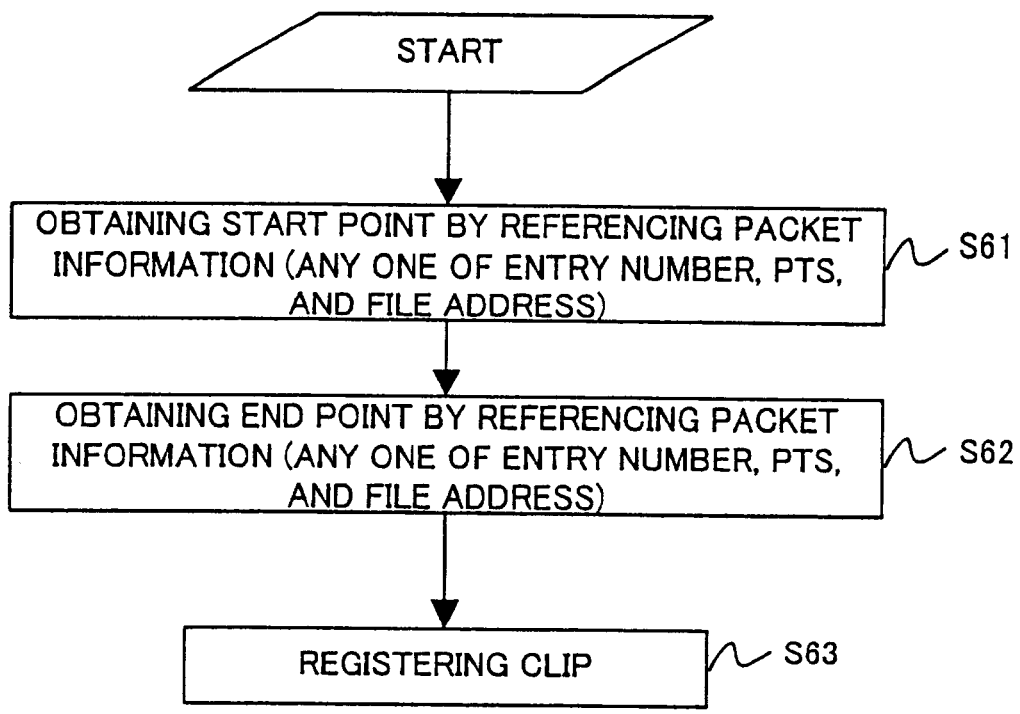
FIG. 11 is a flowchart showing a clip editing process.

Hereinafter, the clip editing process is explained by referring to the flowchart shown in FIG. 11. Any one of an entry number, PTS, and a file address is obtained as a reproduction start point by referencing packet information (step S61 of FIG. 11). Next, any one of the entry number, the PTS, and the file address, which is specified by referencing the packet information list, is obtained as the information of an end point (step S62). Then, the obtained start and end points are registered as clip information.

Only the stream specified by the start and end points is read with the first, the second, or the third packet information reference method when a clip is reproduced, so that an efficient process can be implemented. Additionally, if a clipped stream is desired to be deleted, the stream except for the portion from the start to the end point is deleted.

With the above described clip editing process, only the information about the start and end points of a clip is stored in the information storing unit 24, and an entire image to be clipped is not copied as in a conventional method, thereby saving the required amount of the information storing unit 24.

Furthermore, also when repeat-reproduction, which reproduces a stream in one section an arbitrary number of times, is made, the reproduction can efficiently be made by using a packet information list. The start and end points of repeat-reproduction are obtained with the first, the second, or the third packet information reference method by referencing the packet information list, so that the repeat-reproduction process can efficiently be made. Additionally, it is sufficient to specify only either of the start and end points of repeat-reproduction by obtaining as a reproduction start point the reproduction point when the repeat-reproduction is specified, thereby simplifying the operation performed when a user specifies repeat-reproduction.

For example, if repeat-reproduction until "M" minutes after is specified during reproduction, the start point is automatically determined. This is because TS is set to "0" with the above described third packet information reference method. Therefore, a user does not need to specify the start point. On the other hand, if repeat-reproduction from "M" minutes before is specified, the end point is automatically determined without user specification of the point, thereby simplifying the repeat-reproduction operations.

Explained next are the special recording/reproduction capabilities for simultaneously making recording and reproduction, such as real-time shift, live monitoring, etc.

If an information storing unit 24 is randomly accessible and an access speed is sufficiently fast in an MPEG stream recording/reproducing device, recording and reproduction can simultaneously be made at low cost.

Simultaneous recording and reproduction, which are made for the same stream, are called real-time shift. If the capacity of an information storage medium is unlimited, recording can always be made at the end of a stream. However, a storage medium with an unlimited capacity cannot be realized in the present situation. Therefore, if recording is made at an already reproduced point, unlimited recording can be implemented as long as a reproduction stop, pause, backward reproduction, etc., are not made.

The file address of the stream being reproduced can be obtained as follows. Namely, for example, if a time stamp TS is set to "0" with the third packet information reference method, PTSn' is obtained from the equation (3). Then, the file address can be obtained by referencing a packet information list based on the value of the PTSn'. The file address such that the time stamp TS becomes equal to or smaller than "0" is defined to be a recording start point, so that the MPEG stream can continuously be recorded in a storage area of the information storing unit 24, which has already been reproduced.

Since the capacity of the information storing unit 24 is definite, a stream size must be determined beforehand. If a file address ADDRESS' described in packet information exceeds a stream size SS, an actual file address ADDRESS is determined as follows.

$$ADDRESS=ADDRESS'\%SS \qquad (4)$$

where "%" is an operation symbol for obtaining a remainder.

An update of a packet information list at the time of a real-time shift is made, for example, by deleting the entry having PTS which is smaller than that obtained under the condition of TS≦0, and by adding packet information of a newly recorded stream with the third packet information reference method.

Furthermore, if a stream being decoded is sufficiently close to a recording start point in real-time shift, whether or not a stream has surely been recorded can be verified by reading and reproducing a stream that has just been recorded. Such special recording/reproduction is called live monitoring. By way of example, in a supervisory system, it is necessary to verify whether or not video, etc. is surely recorded, and this is an important capability.

Since a plurality of pieces of data such as a stream to be reproduced, a recorded stream, packet information, etc., flow simultaneously in the above described special reproduction and special recording/reproduction, data transfer processes become complicated. Since also frame skipping is sometimes performed in the special reproduction, the data transfer processes become further complicated. Accordingly, in this preferred embodiment, the encoding unit 21, the decoding unit 26, the memory 22, the information storing unit 24, etc. are controlled by a multitasking OS in order to simplify system control. Fundamental capabilities such as reproduction, recording, etc. are put into tasks, and the respective processes are individually made controllable, whereby reducing the complicatedness of the data transfer processes, etc., in this preferred embodiment.

FIG. 12 explains the tasks when recording and reproduction tasks for at least one channel are managed by a multitasking OS in the image recording/reproducing device according to the first preferred embodiment.

A reproduction task 32 and a recording task 33 perform processes upon receipt of reproduction start/stop and recording start/stop instructions from a main task 31. The reproduction task 32 and the recording task 33 control the tasks each performing a data transfer process.

The reproduction task 32 controls a reproduction data transfer task 34a for making a data transfer from the information storing unit 24 to the memory 22, and a reproduction data transfer task 34b for making a data transfer from the memory 22 to the decoding unit 26.

The recording task 33 controls a recorded data transfer task 35a for making a data transfer from the encoding unit 21 to the memory 22, and a recorded data transfer task 35b for making a data transfer from the memory 22 to the information storing unit 24. The contents of the processes of these tasks will be explained in a second preferred embodiment to be described later.

In the information storing unit 24, a data read/write operation is sometimes suspended for several seconds by an internal process such as an alternate process for performing a write operation to a different area upon detection of a fault in internal parameter adjustment or in a storage area, or the like. According to this preferred embodiment, even if the process in the information storing unit 24 is suspended, influence on other tasks is reduced by dividing the tasks for each data transfer block, and a stable data transfer can be continued.

Figure 13:
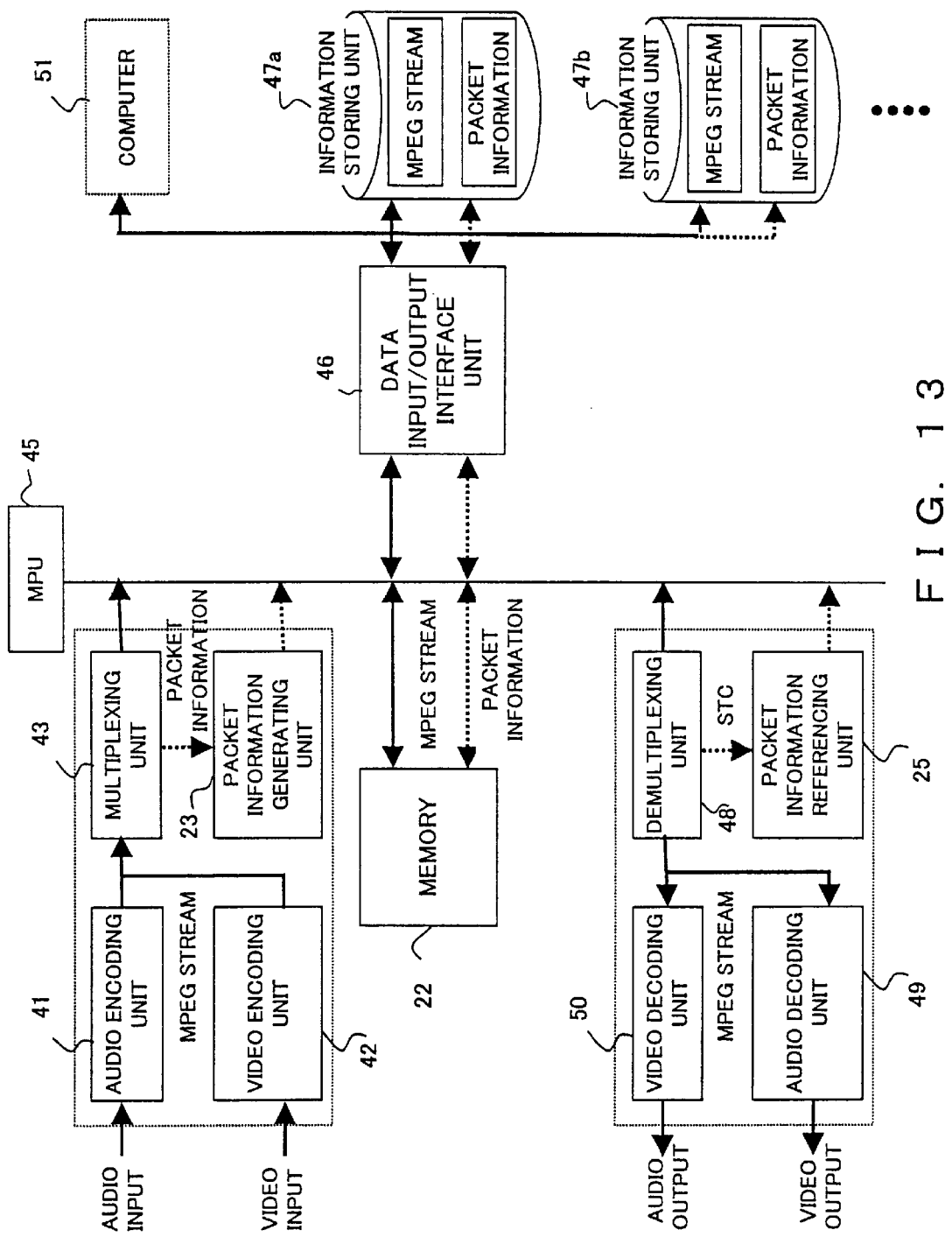
FIG. 13 shows the configuration of a second preferred embodiment.

FIG. 13 shows the configuration of a device storing and reproducing an MPEG stream according to the second preferred embodiment of the present invention.

According to the second preferred embodiment, a recording/reproducing device has the capabilities for encoding and decoding video and audio signals, and can store MPEG streams in a plurality of information storing units. In the following description, the same blocks as those explained in FIG. 2 are denoted with the same reference numerals, and their explanations are omitted.

Audio and video signals are respectively encoded to MPEG audio and video streams in an audio encoding unit 41 and a video encoding unit 42. The encoded video and audio streams are multiplexed by a multiplexing unit 43, and output to a data bus 44.

The multiplexed MPEG stream is stored in any of a plurality of information storing units 47a, 47b, . . . via a data input/output interface unit 46 under the control of an MPU 45. The data input/output interface unit 46 conforms to the standard such as SCSI, ATAPI, IEEE1394, etc.

When an image is reproduced, a multiplexed MPEG stream, which is read from the information storing unit 47a or 47b, is demultiplexed into audio and video streams by a demultiplexing unit 48, and the audio and video streams are decoded to the original audio and video signals.

This recording/reproducing device is connected to a computer 51 via the data input/output interface unit 46, and adopts a file system that is compatible with the computer 51. Accordingly, regardless of whether the information storing units 47a and 47b connected to the recording/reproducing device according to the second preferred embodiment are either non-replaceable or replaceable storage media, image data stored onto the storage media can be exchanged with the computer 51. Furthermore, the MPEG stream encoded by the computer 51, or the MPEG stream downloaded by the computer 51 via a network can be reproduced and edited by the recording/reproducing device.

Figure 14:
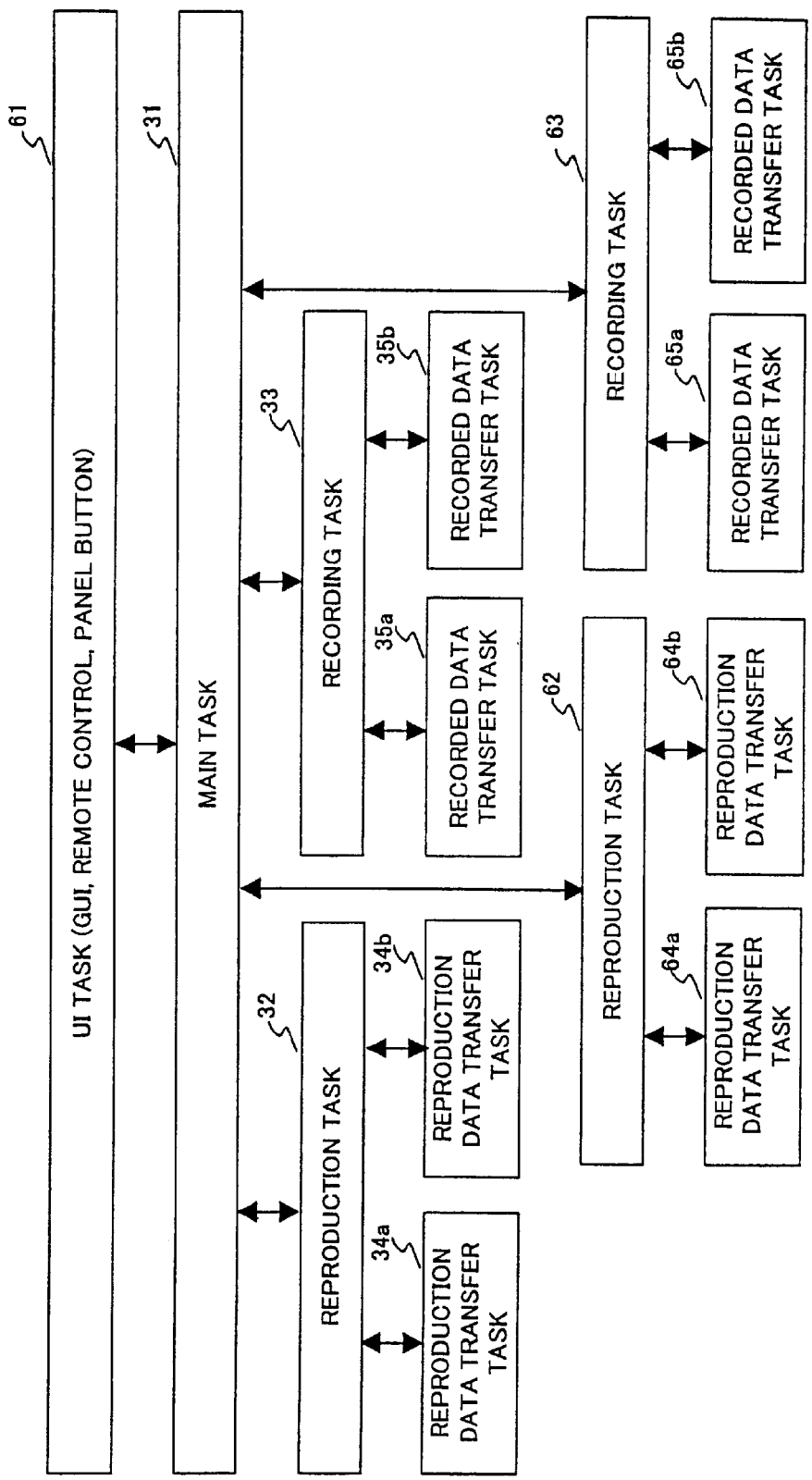
FIG. 14 explains tasks according to the second preferred embodiment.

In the second preferred embodiment, the MPU 45 runs under the environment of a multitasking OS, and can execute reproduction tasks 32 and 62 and recording tasks 33 and 63 for a plurality of channels as shown in FIG. 14.

In FIG. 14, a user interface (UI) task is a task for controlling GUI, detecting an operation signal of remote control and an operation signal of a panel button, etc., and notifies the main task 31 of a detected content as a message.

FIG. 15 is a flowchart showing the process of the user interface task 61. The user interface task 61 determines whether or not a remote control or panel button is pressed. If the remote control or panel button is not pressed, the user interface task 61 repeats this detection process.

If the remote control or panel button is pressed ("YES" in step S71), the user interface task 61 notifies the main task 31 of the content of the operation (step S72).

The main task 31 controls the recording tasks 33 and 63 and the reproduction tasks 32 and 62 according to the messages from the user interface task 61, the recording tasks 33 and 63, the reproduction tasks 32 and 62.

Figure 16:
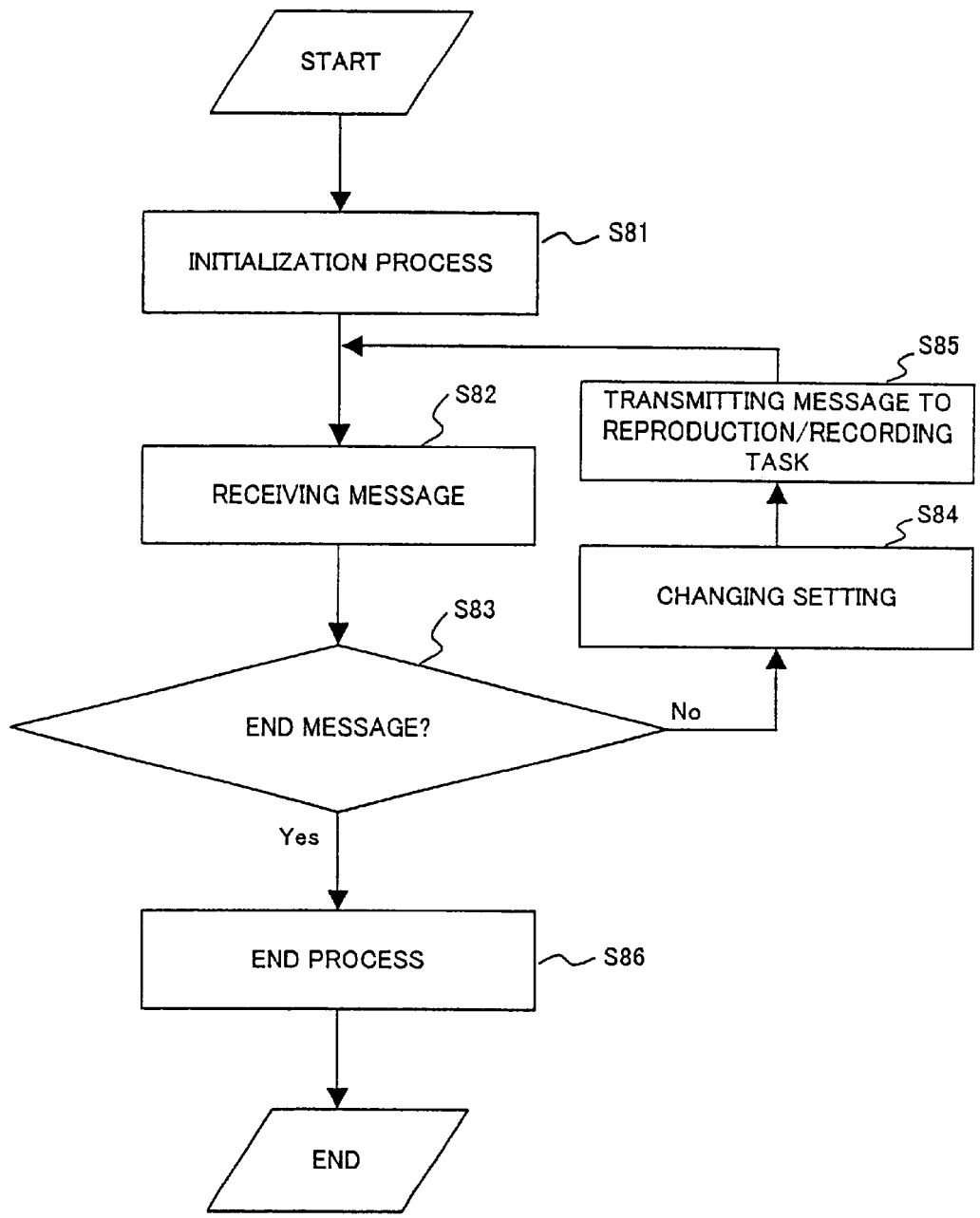
FIG. 16 is a flowchart showing the process of a main task.

FIG. 16 is a flowchart showing the process of the main task 31. The main task 31 first performs an initialization process such as parameter settings, etc. (step S81 of FIG. 16). Next, the main task 31 receives a message from a different task (step S82), and determines whether or not the received message is an end message (step S83). If the received message is not an end message ("NO" in step S83), the process proceeds to step S84 where the information indicating a state such as "during reproduction", "during recording", etc. is set according to the content of the message. Furthermore, the main task 31 transmits a reproduction/recording start/end message to the reproduction tasks 32 and 62 or the recording tasks 33 and 63 based on the set information (step S84). The process then goes back to step S82.

If the received message is an end message ("YES" in step S83), that is, when the user interface task 61 detects a user recording/reproduction end operation and transmits an end message to the main task 31, the main task 31 performs an end process, and initialize the set parameters. The main task 31 is then terminated.

Upon receipt of a reproduction start/end or a recording start/end message from the main task 31, the reproduction tasks 32 and 62 or the recording tasks 33 and 63 perform a reproduction/recording process.

FIG. 17 is a flowchart showing the process of the reproduction task 32 or 62. The reproduction task 32 or 62 first performs an initialization process such as parameter settings, etc. (step S91 of FIG. 17). Next, the reproduction task 32 or 62 receives a message from a different task (step S92), and determines whether or not the received message is an end message (step S93).

If the received message is not an end message ("NO" in step S93), the process proceeds to step S94 where the setting is changed to a reproduction start state, for example, if the received message is the one instructing a reproduction start. Then, the reproduction task 32 or 62 transmits a message instructing a process content to be performed to the reproduction data transfer task 34a and 34b or 64a and 64b according to the instruction issued from the main task 31 (step S95). The process then goes back to step S92.

If the received message is the one instructing a task end ("YES" in step S93), the process proceeds to step S96 where an end process is performed to terminate the task.

FIG. 18 is a flowchart showing the process of the reproduction data transfer task 34a or 64a, which is intended for transferring encoded data that is read from the information storing units 27a, 27b, . . . , to the memory via the data input/output interface unit 46.

The reproduction data transfer task 34a or 64a performs an initialization process to set parameters (step S101 of FIG. 18). Next, the reproduction data transfer task 34a or 64a receives a message from a different task (step S102), and determines whether or not the received message is the one instructing a task end (step S103).

If the received message is not an end message ("NO" in step S103), the reproduction data transfer task 34a or 64a determines whether or not the received message is the one regarding special reproduction or special recording/reproduction (step S104).

If the received message is the one regarding special reproduction or special recording/reproduction ("YES" in step S104), the process proceeds to step S105 where a packet information list is referenced based on the content instructed by the message.

For example, if the message instructs reproduction at a speed-multiple of "N", the reproduction data transfer task 34a or 64a reads a file address of GOP every N−1 from the packet information list with the above described first packet information reference method.

If the received message is not the one instructing special reproduction or special recording/reproduction ("NO" in step S104), the process proceeds to step S106.

Next, the reproduction data transfer task 34a or 64a calculates a required amount of a data transfer according to the content of reproduction or recording, which is instructed by the message (step S106).

With this calculation process, for example, if the process content instructed by the message is forward reproduction at an arbitrary speed-multiple, a data transfer amount for one GOP is calculated from the file addresses of the packet information list, which are referenced in the above described step S105. If fast forward reproduction is made in real-time shift which simultaneously makes recording and reproduction, a data transfer amount such that a reproduction point is not beyond a recording point is calculated.

Next, the reproduction data transfer task 34a or 64a instructs the data input/output interface unit 46 of a data read position from the information storing units 47a, 47b, . . . based on the file address obtained by referencing the above described packet information list, transfers the data to the memory 22 output from the data input/output interface unit 46, and writes the data to the position pointed to by a write pointer (step S107). After the data is transferred, the reproduction data transfer task 34a or 64a changes the value of the write pointer pointing to the memory 22 (step S108). Furthermore, the reproduction data transfer task 34a or 64a transmits a message notifying a result such as termination or continuance of the data transfer process, an error, etc. to the reproduction tasks (step S109). Then, the process goes back to step S102 where the above described operations are repeated.

If the message received in step S103 is determined to be an end message ("YES" in step S103), the process proceeds to step S110 where an end process is performed to terminate the task.

FIG. 19 is a flowchart showing the process of the reproduction data transfer task 34b or 64b, which transfers data from the memory 22 to the demultiplexing unit 48.

The operations in steps S111 through S114 and step S120 of FIG. 19 are the same as those in steps S101 through S104 and S110 of FIG. 18.

If the received message is determined to be the one instructing special reproduction or special recording/reproduction in step S114 ("YES" in step S114 of FIG. 19), the process proceeds to step S115 where the settings of an audio decoding unit 49 and a video decoding unit 50 are changed. These settings are changed so that frame skipping is performed, by way of example, at the time of special reproduction or special recording/reproduction.

Next, the data transfer amount of the reproduction data stored in the memory 22 is calculated (step S116). The data pointed to by a read pointer is read from the memory 22, and the read reproduction data is transferred to the audio decoding unit 49 and the video decoding unit 50 (step S117). Upon termination of the transfer, the value of the read pointer is changed (step S118). Then, a message notifying a result such as termination or continuation of the data transfer process, an error, etc., is transmitted to the reproduction task 32 or 62 which instructed the data transfer (step S119). The process then goes back to step S112, and the above described operations are repeated.

Figure 20:
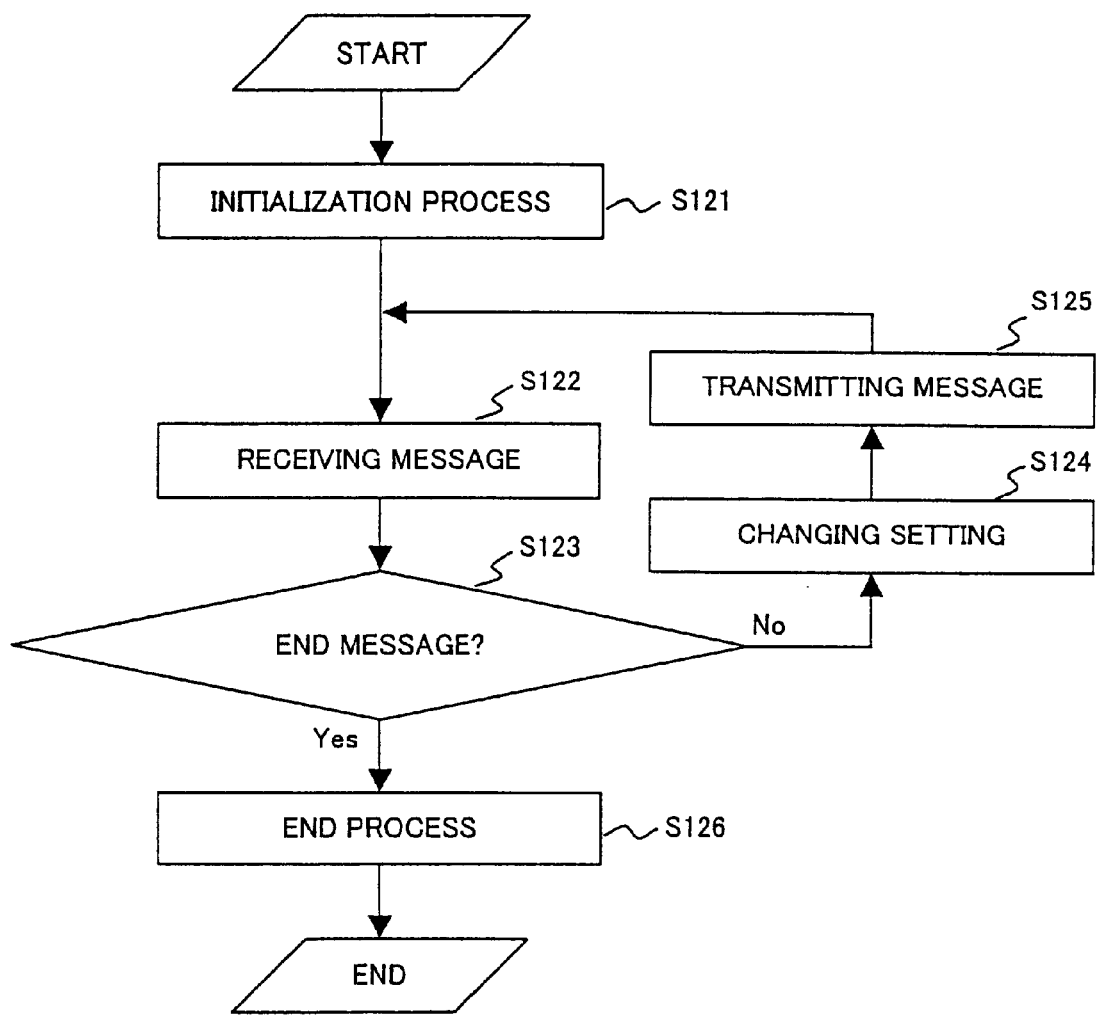
FIG. 20 is a flowchart showing the process of an image recording task.

FIG. 20 is a flowchart showing the process of the recording task 33 or 63. The recording task 33 or 63 sets parameters by performing an initialization process (step S121 of FIG. 20). Next, the recording task 33 or 63 receives a message from a different task (step S122), and determines whether or not the received message is an end message (step S123).

If the received messages it not an end message ("NO" in step S123), the process goes to step S124 where a setting change process is performed. With the setting change process, the state of the task is set to a recording start state, for example, if the received message is the one instructing a recording start, or the state is set to a recording stop state if the received message is the one instructing recording stop.

Next, the recording task 33 or 63 transmits a message instructing a data transfer start/end to the recorded data transfer tasks 35a and 35b or 65a and 65b according to the content instructed by the message (step S125). The process then goes back to step S122.

If the received message is an end message ("YES" in step S123), the process proceeds to step S126 and the task is terminated.

Figure 21:
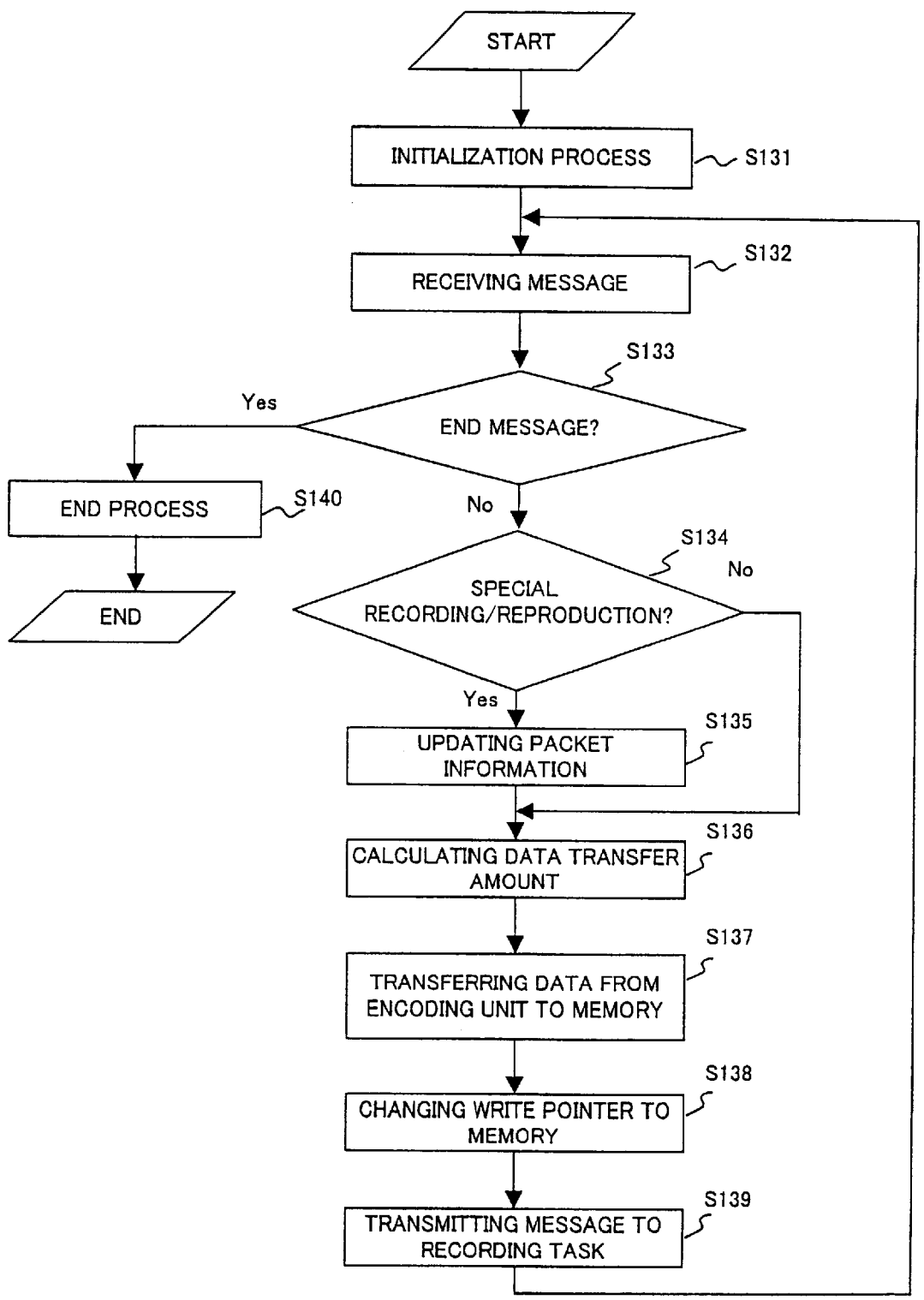

FIG. 21 is a flowchart showing the process of the recorded data transfer task 35a or 65a, which makes a data transfer from the audio encoding unit 41 or the video encoding unit 42 to the memory 22.

The recorded data transfer task 35a or 65a performs an initialization process such as parameter settings, etc. (step S131 of FIG. 21). Next, the recorded data transfer task 35a or 65a receives a message (step S132), and determines whether or not the received message is an end message (step S132). If the received message is not an end message ("NO" in step S133), the process proceeds to step S134 where it is determined whether or not the received message is the one instructing special recording/reproduction.

If the received message is the one instructing special recording/reproduction ("YES" in step S134), the process proceeds to step S135 where packet information is updated. Then, the process proceeds to step S136. With the packet information update process, the packet information of an MPEG stream, which has been reproduced, in the packet information list is overwritten by packet information such as time stamps of a video packet of a newly recorded MPEG stream and an audio packet that is synchronous with the video packet, and the like.

In the meantime, if the received message is not the one instructing special recording/reproduction ("NO" in step S134), that is, if the received message instructs normal recording, the recorded data transfer task 35a or 65a adds to the packet information list the packet information such as the time stamps of the audio and video packets, which are encoded by the audio encoding unit 41 and the video encoding unit 42. The process then proceeds to step S136.

In step S136, the recorded data transfer task 35a or 65a calculates a data transfer amount based on the write pointer pointing to the last write address in the memory and the read pointer pointing to a read address. The recorded data transfer task 35a or 65a transfers data by the calculated amount from the audio encoding unit 41 and the video encoding unit 42 to the memory 22 via the multiplexing unit 45 (step S137). Upon termination of the data transfer, the write pointer pointing to the write position in the memory is changed to the address to which a write operation is lastly made (step S138). Then, the recorded data transfer task 35a or 65a transmits a message notifying a result such as termination or continuation of the recorded data transfer, an error, etc., to the recording task 33 or 63 which instructed the data transfer to the memory 22 (step S139).

If the received message is determined to be an end message in step S133 ("YES" in step S133), an end process is performed to terminate the task.

FIG. 22 is a flowchart showing the process of the recorded data transfer task 35a or 65b, which transfers recorded data from the memory 22 to the data input/output interface unit 46.

The operations in steps S141 through 143 and step S148 of FIG. 22 are the same as those in steps S131 through S133 and step S140 of FIG. 21 respectively.

If the received message is determined not to be an end message in step S143 ("NO" in step S143), the process proceeds to step S144 where the data amount to be transferred to the data input/output interface unit 46 is calculated from the data amount stored in the memory 22. Then, the data by the calculated amount is read from the memory 22, and transferred to the data input/output interface unit 46 (step S145). Upon termination of the data transfer from the memory 22, the value of the read pointer is changed to the lastly read position (step S146). Then, a message notifying a result such as termination or continuance of the recorded data transfer, an error, etc., is transmitted to the recording task 33 or 63 that instructed the recorded data transfer to the data input/output interface unit 46 (step S147). The process then goes back to step S142.

According to the second preferred embodiment, in a recording/reproducing device having the capabilities for encoding and decoding video and audio signals, it is possible to easily obtain a recording/reproduction position in special reproduction such as reproduction a an arbitrary speed-multiple, random access, clip editing/reproduction, etc., or in special recording/reproduction such as real-time shift which simultaneously makes recording and reproduction, live monitoring which reproduces a just recorded image while making recording, etc., by generating packet information composed of PTS included in a packet header and a file address of the packet header when an image and audio are converted into an MPEG stream, and by referencing the packet information. As a result, the special reproduction and special recording/reproduction processes can be made efficient.

Additionally, recording, reproduction, and data transfer processes are put into multiple tasks, thereby simplifying the descriptions of the respective processes. Furthermore, one feature of multitasking is that priorities of tasks are assigned. With this feature, it becomes possible to make a task to which a high priority is assigned run stably, even if multiple tasks exist. Even if both of reproduction and recording tasks exist, a higher priority is assigned to the recording task, thereby preventing data to be recorded from being lost, and improving reliability.

Still further, data transfer processes are put into tasks for respective data transfer paths such as a data transfer from the audio encoding unit 41 and the video encoding unit 42 to the memory 22, a data transfer from the memory 22 to the data input/output interface unit 46, and the like, whereby the running frequency or the transfer block size of each task can individually be set. As a result, even if a data write operation is temporarily disabled to the information storing units 47a, 47b, etc., data to be recorded can be prevented from being lost and reliability can be improved, for example, by setting the data transfer amount of the data transfer task transferring data from the audio encoding unit 41 and the video encoding unit 42 to the memory 22, or the running frequency of the task to be larger or higher than that of the data transfer task transferring data from the memory 22 to the data input/output interface unit 46.

Furthermore, since a data transfer size is determined according to the read start or end point of a stream, processes become complicated if the data transfer size is different depending on whether reproduction is either normal or special. However, the data transfer amount can easily be adjusted by putting the processes into tasks for each data transfer block.

Note that data may directly be transferred from the information storing unit 24 to the decoding unit 26 by means of the reproduction data transfer task 34a, if a suspension frequency is low and if data the amount of which is equal to or larger than that equivalent to a suspension time can be transferred, even in the case where the process is suspended for several seconds in the information storing unit 24. In this case, a data transfer by the reproduction data transfer task 34b becomes unnecessary, and data transfer efficiency increases, whereby it becomes possible to decode an MPEG stream having a higher bit rate. Generally, a bit rate and an image quality have a correlationship. As the bit rate increases, so does the image quality. Accordingly, if the above described task simplification can be made, a stream with a higher image quality can be handled, and more smooth reproduction at a high speed-multiple can be implemented even if frame skipping is performed by a frame skipping capability.

If special recording/reproduction such as real-time shift or live monitoring is made, packet information of a recorded MPEG stream must quickly be added to a packet information list. Therefore, the MPEG stream and the packet information are transferred simultaneously or at very close timing by the recorded data transfer task 35a, so that the packet information list can be updated to the latest. In this way, real-time shift or live monitoring can be implemented by referencing the packet information list.

For a stream recorded by the MPEG stream recording/reproducing device according to this preferred embodiment, its packet information can be generated almost in real time by the packet information generating unit 23. In the meantime, for an MPEG stream recorded by a different device without a packet information generating capability, packet information must be generated to meet a special reproduction request. Therefore, the packet information generating unit 23 automatically detects an MPEG stream for which the packet information is not generated among MPEG streams stored in the information storing unit 4, or reads an MPEG stream specified by a user from the information storing unit 24 to the memory 22, and generates packet information by searching a packet header and a GOP header. This process is performed when reproduction or recording is not made, thereby reducing its influence on other tasks.

Additionally, by arranging a data input/output interface 46 such as SCSI, ATAPI, IEEE 139 in the MPEG stream recording/reproducing device according to this preferred embodiment, a plurality of information storing units 47a, 47b, . . . , or a different computer can be used.

For example, a plurality of information storing units 47a, 47b, . . . , which are implemented by nonreplaceable storage media such as hard disks, etc., are comprised, so that recording for a longer time can be realized and device reliability is improved. Additionally, both of a non-replaceable storage medium such as a hard disk, etc., and a replaceable storage medium such as a magneto-optical disk, an optical disk, etc. are comprised, whereby recording for a longer time can be implemented, and also a recorded MPEG stream can be reproduced by another MPEG stream reproducing device. Furthermore, by adopting the same file system as that of another computer 51, an MPEG stream recorded onto a replaceable storage medium of the MPEG stream recording/reproducing device can be reproduced or edited by the computer 51. Inversely, an MPEG stream which is encoded and recorded by the computer 51, or an MPEG stream downloaded from a network can be reproduced or edited by the MPEG stream recording/reproducing device. Whether the computer 51 supports either the same storage medium as that supported by the recording/reproducing device according to the present invention or a different storage medium, an MPEG stream or different encoded data can be exchanged between both of the storage media via the data input/output interface unit 46.

Figure 23:
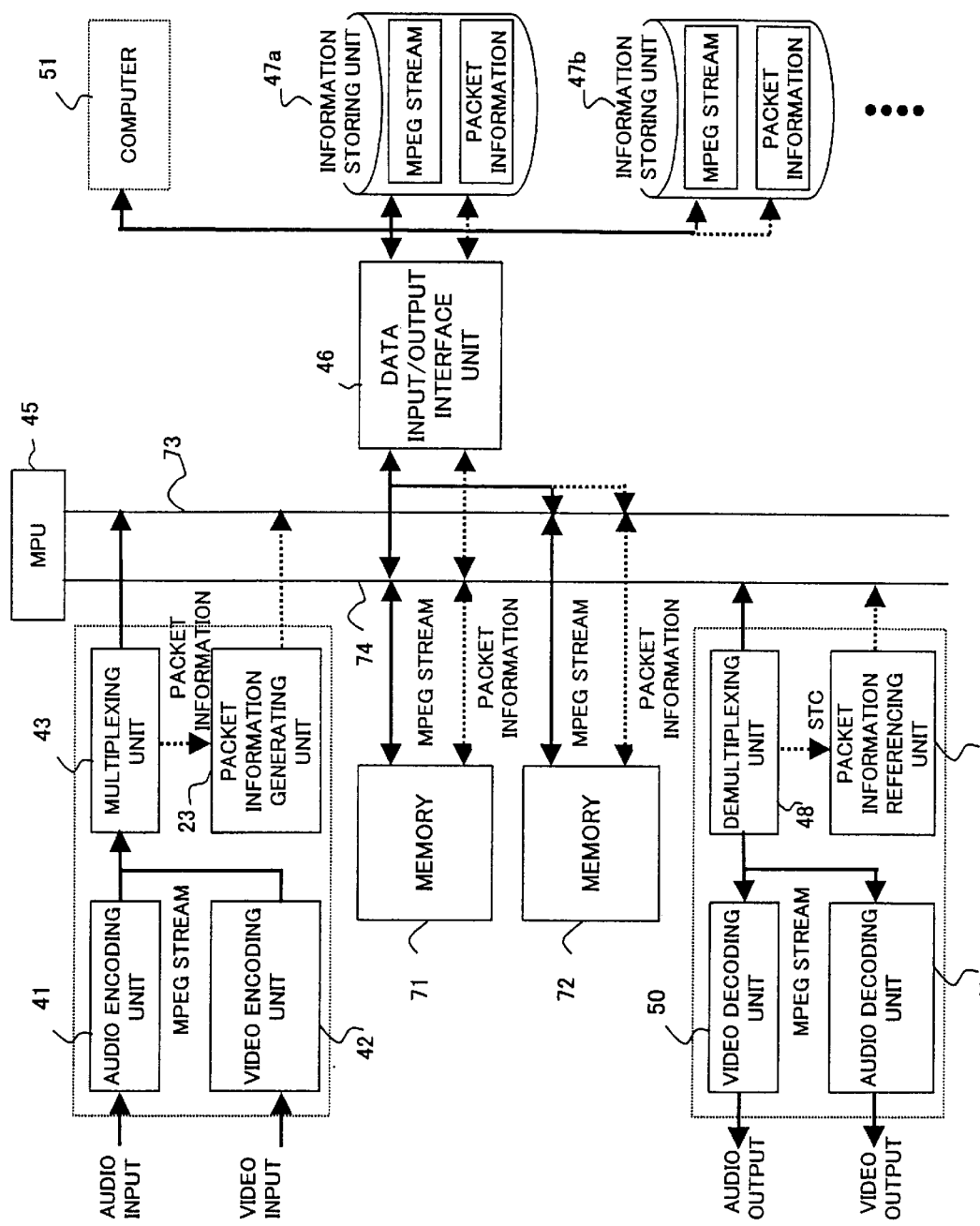
FIG. 23 shows the configuration of a third preferred embodiment.

FIG. 23 shows the configuration of a recording/reproducing device according to a third preferred embodiment of the present invention.

The third preferred embodiment comprises two data buses such as a data transfer bus for recording 73 and a data transfer bs for reproduction 74, which are intended to reduce a transfer time thereon during a data transfer.

The third preferred embodiment further comprises two memories such as a memory 72 for storing transfer data for recording, and a memory 71 for storing data for reproduction in correspondence with the two data buses.

Data that is encoded by the audio encoding unit 41 and the video encoding unit 42 and multiplexed by the multiplexing unit 43 is transferred to the memory 72 via the data transfer bus for recording 73, further transferred from the memory 72 to the data input/output interface unit 46, and stored in the information storing unit 47a and 47b.

When being reproduced, data read from the information storing units 47a and 47b are transferred from the data input/output interface unit 46 to the memory 71 via the data transfer bus for reproduction 74, and is further transferred from the memory 71 to the demultiplexing unit 48 via the data transfer bus for reproduction 74. The data is then demultiplexed into video and audio packets by the demultiplexing unit 48. The video and audio packets are respectively decoded to video and audio signals by the video decoding unit 50 and the audio decoding unit 49.

According to the third preferred embodiment, the two data transfer buses such as the data transfer bus for recording 73 and the data transfer bus for reproduction 74 are arranged, thereby eliminating the need for considering whether or not different data exists on a data bus when switching is made between recording and reproduction. As a result, data transfer efficiency increases.

Figure 24:
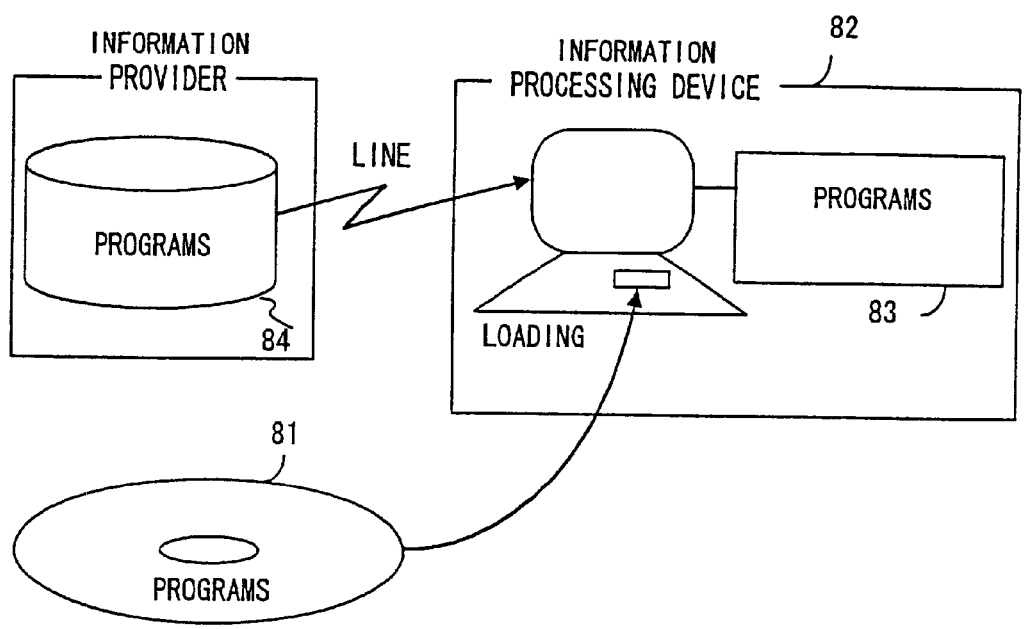
FIG. 24 shows storage media.

FIG. 24 explains the case where programs implementing the recording and reproduction capabilities of the recording/reproducing devices according to the above described preferred embodiments are stored onto a portable storage medium 81 such as a CD-ROM, a floppy disk, etc., or in a storage device 84 possessed by a program provider, and the programs are executed by being loaded into an information processing device 82 of a user.

If the recording/reproduction programs are stored onto the portable storage medium 81 such as a floppy disk, etc., the medium 81 is inserted into a disk drive of the information processing device 82 to read the recording/reproduction programs, and the read programs are stored in a memory 83 such as a RAM, a hard disk, etc., and executed. If the programs are provided by a program provider via a communications line, the programs stored in a storage device 84 or a memory, etc. of the program provider are received by the information processing device 82 via a communications line, and the received programs are stored in the memory 83 such as a RAM, a hard disk, etc., and executed. Notice that the programs stored onto the storage medium 81 may be those implementing part of the recording/reproduction capabilities described in the preferred embodiments.

According to the above described preferred embodiments, packet information composed of PTS included in a packet header and the file address of the packet header is generated, and the packet information is referenced, whereby special reproduction such as random access, reproduction at an arbitrary speed-multiple, clip editing/reproduction, repeat-reproduction, etc., and special recording/reproduction such as real-time shift, live monitoring, etc. can efficiently be implemented. Additionally, by putting into multiple tasks reproduction, recording, a reproduction data transfer, and a recording data transfer, the descriptions of the respective processes, especially, that of the data transfer process can be simplified.

Furthermore, a higher priority is assigned to a task for recording, thereby preventing data to be recorded from being lost. Still further, reproduction, recording, and data transfer tasks are put into multiple channels, thereby reducing the complicatedness of the descriptions for the respective processes. Still further, the processes are put into tasks for each data transfer block and data is sufficiently stored in a memory, whereby a data transfer can be prevented from being delayed when a write or a read operation is suspended in an information storing unit.

A data transfer amount can individually be set for each data transfer block, whereby a data transfer can efficiently be made at the time of special reproduction or special recording.

Whenever data is transferred from an encoding unit to a memory, packet information is transferred along with an MPEG stream and a packet information list is updated. Consequently, even if a recording time is not predetermined and packet information is indefinite as in real-time shift, a recordable storage area is obtained by using updated packet information, thereby easily implementing special recording/reproduction.

Packet information is generated for an MPEG stream that is externally encoded and has no packet information list when neither reproduction nor recording is made, thereby allowing special reproduction of an externally encoded MPEG stream.

Additionally, a file system that is compatible with that of a different computer 51, whereby an MPEG stream encoded by a different computer 51 or an MPEG stream downloaded by a computer 51 from a network can be reproduced or edited by an MPEG stream recording/reproducing device.

Furthermore, a file system that is compatible with that of a different system is adopted, so that an MPEG stream or data can be exchanged with the different system regardless of whether the information storing units 47a and 74b of the recording/reproducing device according to the present invention are either non-replaceable or replaceable storage medium. This greatly contributes to improvement in the performance of the recording/reproducing device and its cost reduction.

Still further, by arranging the data input/output interface unit 46, the recording/reproducing device can use a plurality of information storing units 47a, 47b, . . . , and other storage media.

The above described preferred embodiments refer to the case where the present invention is applied to an MPEG stream recording/reproducing device. However, the present invention is applicable not only to data in an MPEG format but also to encoded data in other formats. In addition, an implementation of the present invention is not limited to a device having both of recording and reproduction capabilities. A device having only a reproduction capability may be implemented. In this case, the reproducing device may comprise the capability for generating the above described packet information from encoded data that is recorded in an external or an internal storage medium. Or, the device may reproduce data based on packet information generated by a different device, without having the capability for generating packet information. Additionally, a storage medium for recording encoded data is not limited to a magnetic disk, an optical disk, a magneto-optical disk, etc. It may be a semiconductor memory, etc.

Furthermore, the reproducing device or the recording/reproducing device according to the present invention may be a reproduction-only or recording/reproduction-only device. Otherwise, the recording/reproduction capabilities or the reproduction capability according to the present invention may be incorporated into an information processing device such as a personal computer, etc.

According to the present invention, packet information composed of PTS included in a packet header and information pointing to the packet header is generated, and the packet information is referenced, so that special reproduction such as random access, reproduction at an arbitrary speed-multiple, clip editing/reproduction, repeat-reproduction, etc., and special recording/reproduction such as real-time shift, live monitoring, etc., can efficiently be made. Additionally, by putting into multiple tasks reproduction, recording, a reproduction data transfer, and a recorded data transfer, descriptions of the respective processes, especially, the descriptions of the data transfer processes can be simplified. Furthermore, transfer data block sizes of data transfer tasks are individually set for the respective tasks, whereby data can efficiently be transferred when special reproduction or special recording/reproduction is made.

What is claimed is:

1. A digital moving picture data player device, comprising:
    a packet information referencing unit referencing a packet information list having an entry for each packet, the entries having a predetermined order, each entry comprising a time stamp included in a corresponding header of an encoded image data packet and position information pointing to a position at which the corresponding packet header is stored, and obtaining the position information corresponding to a playback portion of the image data; and
    a decoding unit decoding encoded image data specified by the position information obtained by said packet information referencing unit.

2. The device according to claim 1, further comprising:
    a packet information generating unit generating the packet information list composed of the time stamp included in a packet header of encoded image data, and the position information pointing to the packet header with the entries in chronological order.

3. The digital moving-picture data player device according to claim 2, wherein:
    the packet information list generating unit generates a packet information list containing a plurality of packet information entries, lining up a chronological order in order to enable a playback at any desired number-times speed;

the packet information referencing unit, when the player device being instructed to perform an N-times speed playback, retrieves every N entry of the packet information contained in the packet information list and obtains the position information pointing to positions at which the packet headers corresponding to the ones in every N entries are stored; and the decoding unit decodes the encoded image data as specified by the position information obtained by said packet information referencing unit to realize the N-times speed playback.

4. The digital moving-picture data player device according to claim 2, further comprising an encoding unit encoding an image data set and having a resulting encoded set of data stored in an internal or external storing unit, wherein controls over encoding and decoding unit operations and transfer of the encoded data set are configured as tasks of a multitask group.

5. The image reproducing device according to claim 4, wherein a decoding process performed by the decoding unit and an encoding process performed by the encoding unit are arranged by a plurality of channels, and the respective processes are put into tasks running on a multitasking OS.

6. The device according to claim 4, wherein an image encoding process performed by the encoding unit, a recorded data transfer process transferring encoded image data to a storing unit, and a reproduction data transfer process transferring the image data stored in the storing unit to the decoding unit, and an encoded image data decoding process performed by the decoding unit are put into multiple tasks.

7. The device according to claim 4, wherein a process transferring recorded data from the encoding unit to a memory, a process transferring the recorded data from the memory to a storing unit, a process transferring playback data from the storing unit to the memory, and a process transferring the playback data from the memory to the decoding unit are respectively put into multiple tasks and priorities of tasks for recording are set to be higher than those of the tasks for reproduction.

8. The device according to claim 4, wherein block sizes associated with transfers of recorded data and playback data can be set to individual values.

9. The device according to claim 4, wherein the transfer data block sizes of a first playback data transfer task transferring playback data from the storing unit to a memory, a second playback data transfer task transferring playback data from the memory to the decoding unit, a first recorded data transfer task transferring recorded data from the encoding unit to the memory, and a second recorded data transfer task transferring recorded data from the memory to the storing unit can individually be set for the respective tasks.

10. The device according to claim 9, wherein when the player device is performing playback not in a special mode, the first playback data transfer task and the second playback data transfer task are configured as one task, and playback data is directly transferred from the storing unit to the decoding unit.

11. The device according to claim 4, wherein when the player device recording, a task of transferring recorded data from the encoding unit to a memory or to the storing unit includes simultaneous transfer of packet information.

12. The device according to claim 4, wherein the packet information generating unit generates the packet information list by extracting the time stamp from the packet headers of an image data set for which packet information is not generated, when during a period in which the play device is not performing either a recording or a playback.

13. The device according to claim 1, further comprising:
an encoding unit encoding an image, and recording the encoded image onto an external or internal storage medium.

14. The device according to claim 13, wherein control of the encoding unit, the decoding unit, and an encoded image data transfer are put into tasks running on a multitasking OS.

15. The device according to claim 1, wherein: the encoded image data is an image encoded in an MPEG format; and the packet information is composed of a presentation time stamp included in a packet header of an MPEG stream, and a file address of the packet header.

16. The device according to claim 15, wherein when making reproduction with a time obtained by using as a criterion a packet being decoded, the decoding unit converts the time into a time stamp, obtains a file address of a packet having a value close to the value obtained from the converted time stamp and time information used as a criterion during decoding based on the packet information, and makes reproduction.

17. The device according to claim 15, wherein the decoding unit makes a random access in units of packets of an MPEG stream based on the packet information.

18. The device according to claim 15, wherein when generating a clip from an MPEG stream, the start and end points of the clip are specified with the time from the start of the MPEG stream or an entry number of the packet information list.

19. The device according to claim 15, wherein when repeat-reproduction is made, reproduction start and end points are specified with the time from the start of an MPEG stream or an entry number of a packet information list.

20. The device according to claim 15, wherein when real-time shift which overwrites a reproduced stream is made, overwrite start and end points are specified with a time from the start of a stream or an entry number of a packet information list.

21. The device according to claim 15, wherein when a just recorded image is reproduced simultaneously with recording, reproduction start and end points are specified with a time from the start of a stream or an entry number of a packet information list.

22. The device according to claim 1, wherein the packet information generating unit extracts a packet header of a packet including a GOP header of an MPEG stream, and generates a packet information list composed of packet information of the packet header of the packet including the GOP header.

23. The device according to claim 1, wherein:
the packet information generating unit generates a packet information list where entry numbers are sequentially assigned to packet information, in order to enable reproduction at an arbitrary speed-multiple; and
the decoding unit obtains a reproduction start or end point of encoded image data based on an entry number of the packet information list.

24. The device according to claim 1, wherein when making reproduction by using as a criterion a time from the start of an MPEG stream, the decoding unit converts the time into a time stamp, obtains a file address of a packet header having time information close to the converted time stamp based on the packet information, and makes reproduction.

25. The device according to claim 1, wherein the decoding unit makes reproduction at an arbitrary speed-multiple by repeating an access to every N-th ("N" is a positive or a negative integer) GOP in a forward direction based on the packet information list.

26. The device according to claim 25, wherein when making backward reproduction, the decoding unit makes reproduction by decoding an image for one frame of every N-th GOP in a backward direction, and by skipping the remaining frames.

27. The device according to claim 1, further comprising a data input/output interface unit a plurality of storing units either external or internal can be connected.

28. The device according to claim 1, wherein a file system is made compatible with that of a different information processing device, and image data can be recorded or played back in common between the different information processing device and the image reproducing device.

29. The digital moving-picture data player device according to claim 1, wherein:
the packet information referencing unit, when the player device having been instructed to perform an N-times speed playback, retrieves one in every N entries of the packet information contained in the packet information list and obtains the position information pointing to positions at which the packet headers corresponding to the ones in every N entries are stored; and
the decoding unit decodes the encoded image data as specified by the position information obtained by said packet information referencing unit to realize the N-times speed playback.

30. The digital moving-picture data player device according to claim 1, wherein:
the encoded image data comprises an MPEG stream of encoded data set in a manner conforming to the MPEG format; and
each of the packet information list entries associates a presentation time stamp included in each of the packet headers associated with the MPEG stream with a file address of the position at which the corresponding packet header is stored.

31. The digital moving-picture data player device according to claim 30, wherein:
the packet information reference unit, when playback positions are specified by the time counted from a front of the MPEG stream, converts the time counted from the front of the MPEG stream into time stamps, finds packet information entries associated with time stamps equal or closest to the time stamps resulting from the conversion from the packet information list and obtains a file address the found packet information entries reference; and
the decoding unit decodes a portion of the MPEG stream specified by the file address obtained by the packet information reference unit.

32. The digital moving-picture data player device according to claim 30, wherein:
the packet information referencing unit, when playback positions are specified by the time counted in a manner relative to the MPEG stream being played back at the time, converts the specified time to a first time stamp, adds the first time stamp to the system clock associated with the MPEG stream that is being decoded at the time to obtain a second time stamp, finds a packet information entry associated with time stamp equal or closest to the second time stamp from the packet information list and obtains a file address the found packet information entry references; and
the decoding unit decodes the MPEG stream specified by the file address obtained by the packet information referencing unit.

33. The digital moving-picture data player device according to claim 30, wherein:
the decoding unit accesses to a position selected randomly from positions within the MPEG stream, the positions being specifiable in units of a packet using the packet information list entries.

34. The digital moving-picture data player device according to claim 30, wherein:
the packet information referencing unit, when the player device is to perform an N-times speed playback, obtains GOPs lining up at forward positions by every N entries in the packet information list; and
the decoding unit realizes the N-times speed playback based on the GOPs obtained by the packet information referencing unit.

35. The digital moving-picture data player device according to claim 30, wherein:
the packet information referencing unit, when the player device is to perform a reverse-direction playback at an N-times speed, obtains file addresses corresponding to the packet information entries lining up at backward positions by every N entries in the packet information list; and
the decoding unit decodes the encoded image data located at the position specified by each of the file addresses obtained by the packet information referencing unit, of which the data volume corresponding to that of one frame of the MPEG stream and plays back the decoded data and ignores data in any other frames.

36. The digital moving-picture data player device according to claim 30, wherein,
when the player device is to generate a clip from the MPEG stream, the packet information referencing unit obtains the file address corresponding to the packet information entry associated with a front end of the clip and a file address corresponding the packet information entries are selected from those contained in the packet information list.

37. The digital moving-picture data player device according to claim 30, wherein,
when the player device is to playback a portion in repeat, the packet information referencing unit obtains a file address corresponding to the packet information entry that is associated with a front end of the playback portion and the file address corresponding to the packet information entry associated with a back end of the playback portion, wherein these packet information entries are selected from those contained in the packet information list.

38. The digital moving-picture data player device according to claim 30, wherein,
when performing a playback in a real-time shift mode in which MPEG stream portions once played back are over written with newly received portions of the MPEG stream, overwrite start and end points are specified with the numbers representing an order of packet information entries chronologically in the packet information list.

39. The digital moving-picture data player device according to claim 30, wherein,
when the player device is to perform simultaneously a recording process of an image data set and a playback process of an already recorded portion of the image data set, the packet information referencing unit specifies both front and back ends of the portion to be played back based on the numbers representing an order of packet information entries chronologically in the packet information list.

40. The digital moving-picture data player device according to claim 1, wherein:

the packet information referencing unit, when a playback portion of the image data is specified by time scale values, converts the time scale values into time stamps, compares between the converted time stamps and the time stamps contained in the packet information list and obtains the position information pointing to positions at which the packet headers corresponding to the time stamps that are close to the time stamps corresponding to the specified playback portion of the encoded image data; and the decoding unit decodes the encoded image data as specified by the position information obtained by said packet information referencing unit to realize the playback.

the decoding unit decodes the encoded image data as specified by the position information obtained by said packet information referencing unit to realize the playback.

41. A digital moving picture image packet data playback method accessing a disc storing encoded image data in image data packets, each packet including a header having a disc storage position and a time stamp, comprising:

referencing a hardware data structure packet information list composed of an entry for each packet, the entries having a predetermined order, each entry comprising the time stamp included in the packet header of the corresponding encoded image data packet and positional information pointing to the disc storage position of the packet header of the corresponding encoded image data packet;

obtaining the position information corresponding to a playback portion of the image data; and decoding the encoded image data as specified by the obtained position information.

42. The method according to claim 41, further comprising generating the packet information list composed of the time stamp and the position information.

43. The method according to claim 41, wherein the packet information is composed of a presentation time stamp included in a packet header of an MPEG stream, and a file address of the packet header.

44. The method according to claim 41, wherein an image data encoding process, a recorded data transfer process transferring the encoded image data to a storage medium, a playback data transfer process transferring playback data stored on a storage medium for reproduction, and an encoded image data decoding process.

45. The method according to claim 41, wherein a first recorded data transfer process transferring encoded recorded data to a memory, a second recorded data transfer process transferring recorded data from the memory to a storage medium when a recording is performed, a first playback data transfer process transferring playback data from the storage medium to the memory, and a second playback data transfer process transferring data of the memory to a task performing a decoding process when a playback is performed are performed in multiple tasks and priorities of tasks for the recording are set to be higher than those of the tasks for the playback.

46. The digital moving-picture data playback method, according to claim 41, wherein:

the encoded image data set comprises an MPEG stream generated via encoding of a data set in a manner conforming to the MPEG format; and each of the packet information entries is associated with a presentation time stamp included in each of the packet headers associated with the MPEG stream with a file address indicating the position at which the corresponding packet header is stored.

47. A computer-readable storage medium on which is recorded a program for causing a computer to execute a process accessing a disc storing encoded image data in image data packets, each racket including a header having a disc storage position and a time stamp, said process comprising:

encoding an image in packets and storing the encoded image onto the disc;

referencing a hardware data structure packet information list composed of an entry for each packet, the entries having a predetermined order, each entry comprising the time stamp included in the packet header of the corresponding encoded image data packet and positional information pointing to the disc storage position of the packet header of the corresponding encoded image data packet;

obtaining the position information corresponding to a playback portion of the image data; and decoding the encoded image data based as specified by the obtained position information.

48. The computer-readable storage medium according to claim 47, said process further comprising generating packet information composed of a time stamp included in a packet header of encoded image data and information pointing to the packet header.

49. The computer-readable storage medium according to claim 41, said process further comprising generating a packet information list containing a plurality of packet information entries in a chronological order, each associating a time stamp included in each packet headers associated with encoded image data with position information pointing to the position at which the corresponding packet header is stored.

50. A digital moving picture data player, comprising:

an encoding unit encoding image in packets;

a packet information generating unit generating a packet information list, comprising an entry for each packet, the entries having a predetermined order, each entry comprising a time stamp included in a packet header of a corresponding encoded image data packet and position information pointing to the packet header of the corresponding encoded image data packet;

a packet information referencing unit referencing the packet information list and obtaining the position information corresponding to a playback portion of the moving picture data; and a decoding unit decoding encoded image data as specified by the position information obtained by said packet information referencing unit.

51. A digital moving picture data player playing image data encoded in encoded image data packets, comprising:

a packet information referencing unit referencing a packet information list having an entry for each packet, each entry comprising a time stamp included in a corresponding header of the encoded image data packet and position information pointing to a position at which the packet is stored, the entries ordered by the time stamp, and obtaining the position information corresponding to a playback portion of the image data specified by a time;

a decoding unit decoding the encoded image data specified by the position information obtained by said packet information referencing unit; and a player unit playing the decoded image data.

52. A digital moving picture data player device accessing a disc storing encoded image data in image data packets, each packet including a header having a disc storage position and a time stamp, said device comprising:

a packet information referencing unit referencing a packet information list having an entry for each packet, the entries having a predetermined order, each entry comprising the time stamp included in the corresponding header of the image data packet and position information pointing to the disc storage position at which the corresponding packet header is stored, and obtaining the position information corresponding to a playback portion of the image data; and a decoding unit decoding encoded image data specified by the position information obtained by said packet information referencing unit and allowing movement within a moving picture to be played responsive to time inputs.

53. A digital moving picture image packet data playback method accessing a disc storing encoded image data in image data packets, each packet including a header having a disc storage position and a time stamp, said method comprising:

allowing the input of time information;

referencing a packet information list composed of an entry for each packet, the entries having a predetermined order, each entry comprising the time stamp included in the packet header of the image data packet and positional information pointing to the disc storage position of the packet header of the corresponding encoded image data packet;

responsive to the time information obtaining the position information from the list corresponding to a playback portion of the image data using the time stamp; and decoding the encoded image data as specified by the obtained position information and allowing movement within a moving picture to be played responsive to the time information.

* * * * *

UNITED STATES PATENT AND TRADEMARK OFFICE
CERTIFICATE OF CORRECTION

PATENT NO. : 6,807,363 B1  Page 1 of 1
APPLICATION NO. : 09/675051
DATED : October 19, 2004
INVENTOR(S) : Yukihiro Abiko It is certified that error appears in the above-identified patent and that said Letters Patent is hereby corrected as shown below:

Foreign Patent Documents
    Change "CM 97122896.5    9/1998 to --CN 971122596.5    9/1998--

Col. 23, line 39 change "reference" to --referencing--
    line 49 change "address" to --addresses--

Col. 25, delete lines 19-22

Col. 26, line 9, change "racket" to --packet--
    line 32 change "41" to --47--

Signed and Sealed this

Twenty-sixth Day of February, 2008

JON W. DUDAS
*Director of the United States Patent and Trademark Office*